United States Patent
Lin

(10) Patent No.: US 9,025,235 B2
(45) Date of Patent: May 5, 2015

(54) OPTICAL INTERFERENCE TYPE OF COLOR DISPLAY HAVING OPTICAL DIFFUSION LAYER BETWEEN SUBSTRATE AND ELECTRODE

(75) Inventor: Wen-Jian Lin, Hsinchu (TW)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/024,815

(22) Filed: Feb. 1, 2008

(65) Prior Publication Data

US 2008/0137175 A1   Jun. 12, 2008

Related U.S. Application Data

(63) Continuation of application No. 10/249,243, filed on Mar. 26, 2003, now Pat. No. 7,342,709.

(30) Foreign Application Priority Data

Dec. 25, 2002   (TW) ................................ 91137264 A

(51) Int. Cl.
*G02B 26/00* (2006.01)
*G02B 26/08* (2006.01)
(Continued)

(52) U.S. Cl.
CPC ................ *G02F 1/29* (2013.01); *G02B 26/001* (2013.01)

(58) Field of Classification Search
CPC .......... G02B 3/14; G02B 5/1876; G02B 5/32; G02B 26/001; G02B 6/29365; G02B 6/29394; G02B 6/29395; G02F 1/1347; G02F 1/29; G02F 2001/294; G02F 1/035; G02F 2203/06; G01J 3/26; G01J 3/0218; G01J 3/42; G01J 5/02; G01J 5/023; G01J 5/024; G01J 5/08

USPC ......... 359/295, 298, 237, 290–292, 242–245, 359/254, 265–271, 277
See application file for complete search history.

(56) References Cited

U.S. PATENT DOCUMENTS

| | | | |
|---|---|---|---|
| 2,518,647 | A | 8/1950 | Teeple et al. |
| 2,534,846 | A | 12/1950 | Ambrose et al. |

(Continued)

FOREIGN PATENT DOCUMENTS

| | | |
|---|---|---|
| CA | 2 490 975 | 1/2004 |
| CN | 1158182 | 8/1997 |

(Continued)

OTHER PUBLICATIONS

Austrian Search Report for U.S. Appl. No. 11/036,965 dated Jul. 25, 2005.

(Continued)

*Primary Examiner* — Stephone B Allen
*Assistant Examiner* — Brandi Thomas
(74) *Attorney, Agent, or Firm* — Knobbe Martens Olson & Bear LLP

(57) ABSTRACT

An optical interference color display comprising a transparent substrate, an inner-front optical diffusion layer, a plurality of first electrodes, a patterned support layer, a plurality of optical films and a plurality of second electrodes is provided. The inner-front optical diffusion layer is on the transparent substrate and the first electrodes are on the inner-front optical diffusion layer. The patterned support layer is on the inner-front optical diffusion layer between the first electrodes. The optical film is on the first electrodes and the second electrodes are positioned over the respective first electrodes. The second electrodes are supported through the patterned support layer. Furthermore, there is an air gap between the second electrodes and their respective first electrodes.

19 Claims, 4 Drawing Sheets

(51) Int. Cl.
*G02F 1/29* (2006.01)
*G02F 1/00* (2006.01)

(56) References Cited

U.S. PATENT DOCUMENTS

| | | |
|---|---|---|
| 2,677,714 A | 5/1954 | Auwarter |
| 3,247,392 A | 4/1966 | Thelen |
| 3,439,973 A | 4/1969 | Bernt et al. |
| 3,443,854 A | 5/1969 | Weiss |
| 3,448,334 A | 6/1969 | Frost |
| 3,653,741 A | 4/1972 | Marks |
| 3,656,836 A | 4/1972 | De Cremoux et al. |
| 3,679,313 A | 7/1972 | Rosenberg |
| 3,725,868 A | 4/1973 | Malmer et al. |
| 3,813,265 A | 5/1974 | Marks |
| 3,886,310 A | 5/1975 | Guldberg et al. |
| 3,924,929 A | 12/1975 | Holmen et al. |
| 3,955,880 A | 5/1976 | Lierke |
| 4,099,854 A | 7/1978 | Decker et al. |
| 4,200,472 A | 4/1980 | Chappell et al. |
| 4,228,437 A | 10/1980 | Shelton |
| 4,287,449 A | 9/1981 | Takeda et al. |
| 4,375,312 A | 3/1983 | Tangonan |
| 4,377,324 A | 3/1983 | Durand |
| 4,378,567 A | 3/1983 | Mir |
| 4,389,096 A | 6/1983 | Hori et al. |
| 4,400,577 A | 8/1983 | Spear |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | Te Velde |
| 4,519,676 A | 5/1985 | Te Velde |
| 4,531,126 A | 7/1985 | Sadones |
| 4,633,031 A | 12/1986 | Todorof |
| 4,663,083 A | 5/1987 | Marks |
| 4,681,403 A | 7/1987 | Te Velde et al. |
| 4,681,406 A | 7/1987 | Naito et al. |
| 4,748,366 A | 5/1988 | Taylor |
| 4,786,128 A | 11/1988 | Birnbach |
| 4,790,635 A | 12/1988 | Apsley |
| 4,832,459 A | 5/1989 | Harper |
| 4,850,682 A | 7/1989 | Gerritsen |
| 4,859,060 A | 8/1989 | Katagiri et al. |
| 4,863,224 A | 9/1989 | Afian et al. |
| 4,878,741 A | 11/1989 | Fergason |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi |
| 4,974,942 A | 12/1990 | Gross |
| 4,980,775 A | 12/1990 | Brody |
| 4,982,184 A | 1/1991 | Kirkwood |
| 5,022,745 A | 6/1991 | Zayhowski et al. |
| 5,037,173 A | 8/1991 | Sampsell et al. |
| 5,038,224 A | 8/1991 | Martulli et al. |
| 5,042,921 A | 8/1991 | Sato et al. |
| 5,044,736 A | 9/1991 | Jaskie et al. |
| 5,050,946 A | 9/1991 | Hathaway et al. |
| 5,075,796 A | 12/1991 | Schildkraut et al. |
| 5,110,370 A | 5/1992 | Vogeli et al. |
| 5,124,834 A | 6/1992 | Cusano et al. |
| 5,142,414 A | 8/1992 | Koehler |
| 5,151,585 A | 9/1992 | Siebert |
| 5,151,801 A | 9/1992 | Hiroshima |
| 5,153,771 A | 10/1992 | Link et al. |
| 5,164,858 A | 11/1992 | Aguilera, Jr. et al. |
| 5,168,406 A | 12/1992 | Nelson |
| 5,192,946 A | 3/1993 | Thompson et al. |
| 5,206,747 A | 4/1993 | Wiley et al. |
| 5,221,982 A | 6/1993 | Faris |
| 5,226,099 A | 7/1993 | Mignardi et al. |
| 5,231,532 A | 7/1993 | Magel et al. |
| 5,233,385 A | 8/1993 | Sampsell |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,287,215 A | 2/1994 | Warde et al. |
| 5,289,300 A * | 2/1994 | Yamazaki et al. .............. 349/42 |
| 5,291,314 A | 3/1994 | Agranat et al. |
| 5,293,272 A | 3/1994 | Jannson et al. |
| 5,311,360 A | 5/1994 | Bloom et al. |
| 5,326,426 A | 7/1994 | Tam et al. |
| 5,327,263 A | 7/1994 | Katagiri et al. |
| 5,339,179 A | 8/1994 | Rudisill et al. |
| 5,341,242 A | 8/1994 | Gilboa et al. |
| 5,345,322 A | 9/1994 | Fergason |
| 5,356,488 A | 10/1994 | Hezel |
| 5,361,190 A | 11/1994 | Roberts et al. |
| 5,365,283 A | 11/1994 | Doherty et al. |
| 5,381,253 A | 1/1995 | Sharp et al. |
| 5,387,953 A | 2/1995 | Minoura et al. |
| 5,387,991 A | 2/1995 | Mitsutake et al. |
| 5,398,125 A | 3/1995 | Willett et al. |
| 5,398,170 A | 3/1995 | Lee |
| 5,401,983 A | 3/1995 | Jokerst et al. |
| 5,418,631 A | 5/1995 | Tedesco |
| 5,446,510 A | 8/1995 | Mitsutake et al. |
| 5,448,314 A | 9/1995 | Heimbuch et al. |
| 5,448,659 A | 9/1995 | Tsutsui et al. |
| 5,452,385 A | 9/1995 | Izumi et al. |
| 5,459,610 A | 10/1995 | Bloom et al. |
| 5,467,417 A | 11/1995 | Nakamura et al. |
| 5,474,865 A | 12/1995 | Vasudev |
| 5,481,385 A | 1/1996 | Zimmerman et al. |
| 5,497,172 A | 3/1996 | Doherty et al. |
| 5,500,635 A | 3/1996 | Mott |
| 5,500,761 A | 3/1996 | Goossen et al. |
| 5,515,184 A | 5/1996 | Caulfield |
| 5,517,347 A | 5/1996 | Sampsell |
| 5,517,366 A | 5/1996 | Togino |
| 5,550,373 A | 8/1996 | Cole et al. |
| 5,555,160 A | 9/1996 | Tawara et al. |
| 5,555,186 A | 9/1996 | Shioya |
| 5,579,149 A | 11/1996 | Moret et al. |
| 5,592,332 A | 1/1997 | Nishio et al. |
| 5,594,830 A | 1/1997 | Winston et al. |
| 5,601,351 A | 2/1997 | Van Den Brandt |
| 5,604,607 A | 2/1997 | Mirzaoff |
| 5,606,441 A | 2/1997 | Florence et al. |
| 5,615,024 A | 3/1997 | May et al. |
| 5,619,059 A | 4/1997 | Li et al. |
| 5,619,365 A | 4/1997 | Rhoads et al. |
| 5,619,366 A | 4/1997 | Rhoads et al. |
| 5,626,408 A | 5/1997 | Heynderickx et al. |
| 5,633,739 A | 5/1997 | Matsuyama et al. |
| 5,636,052 A | 6/1997 | Arney et al. |
| 5,638,084 A | 6/1997 | Kalt |
| 5,647,036 A | 7/1997 | Deacon et al. |
| 5,650,865 A | 7/1997 | Smith |
| 5,659,410 A | 8/1997 | Koike et al. |
| 5,671,314 A | 9/1997 | Gregory et al. |
| 5,671,994 A | 9/1997 | Tai et al. |
| 5,673,128 A | 9/1997 | Ohta et al. |
| 5,703,667 A | 12/1997 | Ochiai |
| 5,703,710 A | 12/1997 | Brinkman et al. |
| 5,706,134 A | 1/1998 | Konno et al. |
| 5,710,656 A | 1/1998 | Goossen |
| 5,712,694 A | 1/1998 | Taira et al. |
| 5,731,857 A | 3/1998 | Neijzen |
| 5,735,590 A | 4/1998 | Kashima et al. |
| 5,739,945 A | 4/1998 | Tayebati |
| 5,745,281 A | 4/1998 | Yi |
| 5,749,642 A | 5/1998 | Kimura et al. |
| 5,751,492 A | 5/1998 | Meyers |
| 5,754,260 A | 5/1998 | Ooi et al. |
| 5,771,124 A | 6/1998 | Kintz |
| 5,771,321 A * | 6/1998 | Stern .............................. 385/31 |
| 5,772,299 A | 6/1998 | Koo et al. |
| 5,782,993 A | 7/1998 | Ponewash |
| 5,782,995 A | 7/1998 | Nanya et al. |
| 5,783,614 A | 7/1998 | Chen |

(56) References Cited

U.S. PATENT DOCUMENTS

| | | |
|---|---|---|
| 5,805,117 A | 9/1998 | Mazurek |
| 5,808,708 A | 9/1998 | Oyama et al. |
| 5,810,464 A | 9/1998 | Ishikawa et al. |
| 5,815,229 A | 9/1998 | Shapiro |
| 5,816,677 A | 10/1998 | Kurematsu et al. |
| 5,818,095 A | 10/1998 | Sampsell |
| 5,835,255 A | 11/1998 | Miles |
| 5,835,256 A | 11/1998 | Huibers |
| 5,845,035 A | 12/1998 | Wimberger-Friedl |
| 5,853,240 A | 12/1998 | Tanaka et al. |
| 5,853,310 A | 12/1998 | Nishimura et al. |
| 5,854,872 A | 12/1998 | Tai |
| 5,868,480 A | 2/1999 | Zeinali |
| 5,877,874 A | 3/1999 | Rosenberg |
| 5,883,684 A | 3/1999 | Millikan et al. |
| 5,886,688 A | 3/1999 | Fifield et al. |
| 5,892,598 A | 4/1999 | Asakawa et al. |
| 5,894,359 A | 4/1999 | Suzuki et al. |
| 5,895,851 A * | 4/1999 | Kano et al. ............... 73/504.04 |
| 5,913,594 A | 6/1999 | Iimura |
| 5,914,804 A | 6/1999 | Goossen |
| 5,920,417 A | 7/1999 | Johnson |
| 5,933,183 A | 8/1999 | Enomoto |
| 5,956,106 A | 9/1999 | Petersen et al. |
| 5,959,763 A | 9/1999 | Bozler et al. |
| 5,975,703 A | 11/1999 | Holman et al. |
| 5,982,540 A | 11/1999 | Koike |
| 5,986,796 A | 11/1999 | Miles |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau |
| 6,023,373 A | 2/2000 | Inoguchi et al. |
| 6,028,649 A | 2/2000 | Faris et al. |
| 6,028,690 A | 2/2000 | Carter et al. |
| 6,031,653 A | 2/2000 | Wang |
| 6,040,937 A | 3/2000 | Miles |
| 6,046,840 A | 4/2000 | Huibers |
| 6,048,071 A | 4/2000 | Sawayama |
| 6,049,317 A | 4/2000 | Thompson et al. |
| 6,055,090 A | 4/2000 | Miles |
| 6,072,620 A | 6/2000 | Shiono et al. |
| 6,073,034 A | 6/2000 | Jacobsen et al. |
| 6,074,069 A | 6/2000 | Chao-Ching et al. |
| 6,088,102 A | 7/2000 | Manhart |
| 6,088,941 A | 7/2000 | Inbar et al. |
| 6,091,469 A | 7/2000 | Naito |
| 6,094,285 A | 7/2000 | Wickham et al. |
| 6,099,134 A | 8/2000 | Taniguchi et al. |
| 6,100,952 A | 8/2000 | Marvin et al. |
| 6,113,239 A | 9/2000 | Sampsell et al. |
| 6,128,077 A | 10/2000 | Jovin et al. |
| 6,147,728 A | 11/2000 | Okumura et al. |
| 6,151,089 A | 11/2000 | Yang et al. |
| 6,166,834 A | 12/2000 | Taketomi et al. |
| 6,167,761 B1 * | 1/2001 | Hanzawa et al. ............ 73/724 |
| 6,195,196 B1 * | 2/2001 | Kimura et al. ............ 359/295 |
| 6,196,691 B1 | 3/2001 | Ochiai |
| 6,199,989 B1 | 3/2001 | Maeda et al. |
| 6,201,633 B1 | 3/2001 | Peeters et al. |
| 6,208,466 B1 | 3/2001 | Liu et al. |
| 6,211,976 B1 | 4/2001 | Popovich |
| 6,213,606 B1 | 4/2001 | Holman et al. |
| 6,232,937 B1 | 5/2001 | Jacobsen et al. |
| 6,243,149 B1 | 6/2001 | Swanson et al. |
| 6,259,082 B1 | 7/2001 | Fujimoto et al. |
| 6,273,577 B1 | 8/2001 | Goto et al. |
| 6,282,010 B1 | 8/2001 | Sulzbach |
| 6,283,602 B1 | 9/2001 | Kawaguchi et al. |
| 6,285,424 B1 | 9/2001 | Yoshida |
| 6,288,824 B1 | 9/2001 | Kastalsky |
| 6,292,504 B1 | 9/2001 | Halmos |
| 6,300,558 B1 | 10/2001 | Takamoto et al. |
| 6,301,000 B1 | 10/2001 | Johnson |
| 6,301,026 B1 | 10/2001 | Ueda |
| 6,322,236 B1 | 11/2001 | Campbell et al. |
| 6,323,415 B1 | 11/2001 | Uematsu et al. |
| 6,323,892 B1 | 11/2001 | Mihara |
| 6,323,923 B1 | 11/2001 | Hoshino et al. |
| 6,323,987 B1 | 11/2001 | Rinaudo et al. |
| 6,342,970 B1 | 1/2002 | Sperger et al. |
| 6,356,378 B1 | 3/2002 | Huibers |
| 6,359,668 B1 | 3/2002 | Iijima et al. |
| 6,368,885 B1 | 4/2002 | Offenberg et al. |
| 6,371,623 B1 | 4/2002 | Toyoda |
| 6,375,327 B2 | 4/2002 | Holman et al. |
| 6,377,233 B2 | 4/2002 | Colgan et al. |
| 6,377,535 B1 | 4/2002 | Chen et al. |
| 6,381,022 B1 | 4/2002 | Zavracky |
| 6,399,257 B1 | 6/2002 | Shirota et al. |
| 6,400,738 B1 | 6/2002 | Tucker et al. |
| 6,402,325 B1 | 6/2002 | Yamamoto |
| 6,407,785 B1 | 6/2002 | Yamazaki |
| 6,411,423 B2 | 6/2002 | Ham |
| 6,412,969 B1 | 7/2002 | Torihara et al. |
| 6,421,103 B2 | 7/2002 | Yamaguchi |
| 6,431,716 B1 | 8/2002 | Kusakabe |
| 6,442,124 B1 | 8/2002 | Chung et al. |
| 6,448,709 B1 | 9/2002 | Chuang |
| 6,454,452 B1 | 9/2002 | Sasagawa et al. |
| 6,456,279 B1 | 9/2002 | Kubo et al. |
| 6,466,354 B1 | 10/2002 | Gudeman |
| 6,466,358 B2 | 10/2002 | Tew |
| 6,470,115 B1 | 10/2002 | Yonekubo |
| 6,478,432 B1 | 11/2002 | Dyner |
| 6,480,634 B1 | 11/2002 | Corrigan |
| 6,483,613 B1 | 11/2002 | Woodgate et al. |
| 6,493,475 B1 | 12/2002 | Lin |
| 6,494,588 B1 | 12/2002 | Okada |
| 6,504,589 B1 | 1/2003 | Kashima et al. |
| 6,512,626 B1 | 1/2003 | Schmidt |
| 6,518,944 B1 | 2/2003 | Doane et al. |
| 6,519,073 B1 | 2/2003 | Goossen |
| 6,520,643 B1 | 2/2003 | Holman et al. |
| 6,522,373 B1 | 2/2003 | Hira et al. |
| 6,522,792 B1 | 2/2003 | Sugamata et al. |
| 6,522,794 B1 | 2/2003 | Bischel et al. |
| 6,527,410 B2 | 3/2003 | Yamaguchi |
| 6,538,813 B1 | 3/2003 | Magno |
| 6,540,368 B2 | 4/2003 | Akaoka |
| 6,545,734 B2 | 4/2003 | Cornelissen et al. |
| 6,549,338 B1 | 4/2003 | Wolverton et al. |
| 6,561,661 B2 | 5/2003 | Egawa |
| 6,565,225 B2 | 5/2003 | Mabuchi et al. |
| 6,574,033 B1 | 6/2003 | Chui |
| 6,577,429 B1 | 6/2003 | Kurtz |
| 6,580,496 B2 | 6/2003 | Bamji et al. |
| 6,582,095 B1 | 6/2003 | Toyoda |
| 6,592,234 B2 | 7/2003 | Epstein et al. |
| 6,597,419 B1 | 7/2003 | Okada et al. |
| 6,597,490 B2 | 7/2003 | Tayebati |
| 6,598,987 B1 | 7/2003 | Parikka |
| 6,603,520 B2 | 8/2003 | Umemoto et al. |
| 6,624,944 B1 | 9/2003 | Wallace et al. |
| 6,630,786 B2 | 10/2003 | Cummings et al. |
| 6,630,968 B1 | 10/2003 | Tsuchihashi et al. |
| 6,631,998 B2 | 10/2003 | Egawa et al. |
| 6,636,283 B2 | 10/2003 | Sasagawa et al. |
| 6,636,322 B1 | 10/2003 | Terashita |
| 6,636,358 B2 | 10/2003 | Umemoto et al. |
| 6,636,653 B2 | 10/2003 | Miracky et al. |
| 6,642,913 B1 | 11/2003 | Kimura |
| 6,642,976 B2 | 11/2003 | Umemoto et al. |
| 6,643,067 B2 | 11/2003 | Miyamae et al. |
| 6,643,069 B2 | 11/2003 | Dewald |
| 6,646,772 B1 | 11/2003 | Popovich et al. |
| 6,650,455 B2 | 11/2003 | Miles |
| 6,652,109 B2 | 11/2003 | Nakamura |
| 6,655,820 B2 | 12/2003 | Jung et al. |
| 6,657,683 B2 | 12/2003 | Richard |
| 6,657,700 B2 | 12/2003 | Sako et al. |
| 6,659,615 B2 | 12/2003 | Umemoto |
| 6,660,997 B2 | 12/2003 | Laberge et al. |

(56) References Cited

U.S. PATENT DOCUMENTS

| | | | |
|---|---|---|---|
| 6,667,782 B1 | 12/2003 | Taira et al. |
| 6,669,350 B2 | 12/2003 | Yamashita |
| 6,674,562 B1 | 1/2004 | Miles |
| 6,677,709 B1 | 1/2004 | Ma et al. |
| 6,680,792 B2 | 1/2004 | Miles |
| 6,683,693 B1 | 1/2004 | O Tsuka et al. |
| 6,687,040 B2 | 2/2004 | Kimura |
| 6,693,690 B2 | 2/2004 | Umemoto |
| 6,696,140 B2 | 2/2004 | Suzuki |
| 6,706,339 B1 | 3/2004 | Miyatake et al. |
| 6,709,123 B2 | 3/2004 | Flohr |
| 6,738,194 B1 | 5/2004 | Ramirez et al. |
| 6,742,907 B2 | 6/2004 | Funamoto et al. |
| 6,742,921 B2 | 6/2004 | Umemoto |
| 6,747,801 B2 | 6/2004 | Umemoto et al. |
| 6,751,023 B2 | 6/2004 | Umemoto et al. |
| 6,760,135 B1 | 7/2004 | Payne |
| 6,760,146 B2 | 7/2004 | Ikeda et al. |
| 6,761,461 B2 | 7/2004 | Mizutani et al. |
| 6,768,555 B2 | 7/2004 | Chen et al. |
| 6,773,126 B1 | 8/2004 | Hatjasalo et al. |
| 6,774,962 B2 * | 8/2004 | Yoon ............................ 349/98 |
| 6,778,746 B2 | 8/2004 | Charlton et al. |
| 6,784,948 B2 | 8/2004 | Kawashima et al. |
| 6,792,293 B1 | 9/2004 | Awan et al. |
| 6,794,119 B2 | 9/2004 | Miles |
| 6,798,469 B2 | 9/2004 | Kimura |
| 6,806,924 B2 | 10/2004 | Niiyama et al. |
| 6,811,267 B1 | 11/2004 | Allen et al. |
| 6,819,380 B2 | 11/2004 | Wen et al. |
| 6,822,745 B2 | 11/2004 | De Groot et al. |
| 6,822,780 B1 | 11/2004 | Long, Jr. |
| 6,825,895 B2 | 11/2004 | Nakano et al. |
| 6,826,000 B2 | 11/2004 | Lee et al. |
| 6,829,258 B1 | 12/2004 | Carlisle et al. |
| 6,841,787 B2 | 1/2005 | Almogy |
| 6,844,953 B2 | 1/2005 | Reboa |
| 6,844,959 B2 | 1/2005 | Huibers et al. |
| 6,852,396 B1 | 2/2005 | Mineo |
| 6,853,418 B2 | 2/2005 | Suzuki et al. |
| 6,861,121 B2 | 3/2005 | Matsunaga et al. |
| 6,862,141 B2 | 3/2005 | Olczak |
| 6,863,428 B2 | 3/2005 | Lundin |
| 6,864,882 B2 | 3/2005 | Newton |
| 6,865,312 B2 | 3/2005 | Niv et al. |
| 6,866,393 B2 | 3/2005 | Yano et al. |
| 6,867,896 B2 | 3/2005 | Miles |
| 6,870,581 B2 | 3/2005 | Li et al. |
| 6,871,982 B2 | 3/2005 | Holman et al. |
| 6,879,354 B1 | 4/2005 | Sawayama |
| 6,880,959 B2 | 4/2005 | Houston |
| 6,882,421 B2 | 4/2005 | Opsal et al. |
| 6,882,458 B2 | 4/2005 | Lin et al. |
| 6,882,461 B1 | 4/2005 | Tsai |
| 6,883,924 B2 | 4/2005 | Maeda et al. |
| 6,883,934 B2 | 4/2005 | Kawakami et al. |
| 6,885,377 B2 | 4/2005 | Lim |
| 6,891,530 B2 | 5/2005 | Umemoto et al. |
| 6,897,855 B1 | 5/2005 | Matthies et al. |
| 6,897,923 B2 | 5/2005 | Kanesaka et al. |
| 6,912,022 B2 | 6/2005 | Lin |
| 6,917,469 B2 | 7/2005 | Momose et al. |
| 6,927,387 B2 | 8/2005 | Viktorovitch |
| 6,930,816 B2 | 8/2005 | Mochizuki |
| 6,951,401 B2 | 10/2005 | Van Hees et al. |
| 6,960,010 B2 | 11/2005 | Matsumoto et al. |
| 6,961,045 B2 | 11/2005 | Tsao |
| 6,964,484 B2 | 11/2005 | Gupta et al. |
| 6,967,779 B2 | 11/2005 | Fadel et al. |
| 6,970,031 B1 | 11/2005 | Martin et al. |
| 6,972,827 B2 | 12/2005 | Mi |
| 6,982,820 B2 | 1/2006 | Tsai |
| 6,995,890 B2 | 2/2006 | Lin |
| 6,998,196 B2 | 2/2006 | Rich et al. |
| 6,999,225 B2 | 2/2006 | Lin et al. |
| 6,999,235 B2 | 2/2006 | Nakamura |
| 6,999,236 B2 | 2/2006 | Lin et al. |
| 7,002,726 B2 | 2/2006 | Patel |
| 7,004,610 B2 | 2/2006 | Yamashita |
| 7,006,272 B2 | 2/2006 | Tsai |
| 7,009,754 B2 | 3/2006 | Huibers |
| 7,010,212 B2 | 3/2006 | Emmons et al. |
| 7,012,659 B2 | 3/2006 | Smith et al. |
| 7,016,095 B2 | 3/2006 | Lin |
| 7,018,088 B2 | 3/2006 | Yu et al. |
| 7,019,734 B2 | 3/2006 | Cross et al. |
| 7,025,461 B2 | 4/2006 | Veligdan et al. |
| 7,030,949 B2 | 4/2006 | Kashima |
| 7,034,981 B2 | 4/2006 | Makigaki |
| 7,038,752 B2 | 5/2006 | Lin |
| 7,041,344 B2 | 5/2006 | Kusume et al. |
| 7,042,444 B2 | 5/2006 | Cok |
| 7,042,643 B2 | 5/2006 | Miles |
| 7,046,409 B2 | 5/2006 | Kihara |
| 7,050,219 B2 | 5/2006 | Kimura |
| 7,054,045 B2 | 5/2006 | McPheters et al. |
| 7,056,001 B2 | 6/2006 | Chuang |
| 7,061,226 B2 | 6/2006 | Durr |
| 7,064,875 B2 | 6/2006 | Kawano et al. |
| 7,068,948 B2 | 6/2006 | Wei et al. |
| 7,072,093 B2 | 7/2006 | Piehl et al. |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,128,459 B2 | 10/2006 | Igarashi et al. |
| 7,130,104 B2 | 10/2006 | Cummings |
| 7,133,022 B2 | 11/2006 | Grabert |
| 7,136,213 B2 | 11/2006 | Chui |
| 7,138,984 B1 | 11/2006 | Miles |
| 7,142,346 B2 | 11/2006 | Chui et al. |
| 7,142,347 B2 | 11/2006 | Islam |
| 7,156,546 B2 | 1/2007 | Higashiyama |
| 7,161,136 B1 | 1/2007 | Wenstrand et al. |
| 7,161,728 B2 | 1/2007 | Sampsell et al. |
| 7,161,730 B2 | 1/2007 | Floyd |
| 7,172,915 B2 | 2/2007 | Lin et al. |
| 7,180,672 B2 | 2/2007 | Olczak |
| 7,187,489 B2 | 3/2007 | Miles |
| 7,206,133 B2 | 4/2007 | Cassarly et al. |
| 7,210,806 B2 | 5/2007 | Holman et |
| 7,212,345 B2 | 5/2007 | Wilson |
| 7,218,429 B2 | 5/2007 | Batchko |
| 7,218,812 B2 | 5/2007 | Maxwell et al. |
| 7,221,418 B2 | 5/2007 | Lee et al. |
| 7,223,010 B2 | 5/2007 | Min et al. |
| 7,236,663 B2 | 6/2007 | Wakita et al. |
| 7,256,922 B2 | 8/2007 | Chui et al. |
| 7,262,754 B1 | 8/2007 | Yamazaki |
| 7,262,916 B2 | 8/2007 | Kao et al. |
| 7,264,389 B2 | 9/2007 | Sado et al. |
| 7,304,784 B2 | 12/2007 | Chui et al. |
| 7,324,248 B2 | 1/2008 | Brotherton-Ratcliffe et al. |
| 7,324,284 B2 | 1/2008 | Olczak |
| 7,327,510 B2 | 2/2008 | Cummings et al. |
| 7,335,780 B2 | 2/2008 | Annis |
| 7,336,329 B2 | 2/2008 | Yoon |
| 7,342,705 B2 | 3/2008 | Chui et al. |
| 7,342,709 B2 | 3/2008 | Lin |
| 7,349,139 B2 | 3/2008 | Chui et al. |
| 7,349,141 B2 | 3/2008 | Tung et al. |
| 7,352,501 B2 | 4/2008 | Chopra et al. |
| 7,352,940 B2 | 4/2008 | Charters et al. |
| 7,355,780 B2 | 4/2008 | Chui et al. |
| 7,357,552 B2 | 4/2008 | Takada |
| 7,357,557 B2 | 4/2008 | Miyashita |
| 7,359,011 B2 | 4/2008 | Hamada et al. |
| 7,360,899 B2 | 4/2008 | McGuire |
| 7,366,393 B2 | 4/2008 | Cassarly et al. |
| 7,369,292 B2 | 5/2008 | Xu et al. |
| 7,369,294 B2 | 5/2008 | Gally |

(56) References Cited

U.S. PATENT DOCUMENTS

| | | |
|---|---|---|
| 7,372,449 B2 | 5/2008 | Kodama et al. |
| 7,372,631 B2 | 5/2008 | Ozawa |
| 7,374,327 B2 | 5/2008 | Schexnaider |
| 7,375,779 B2 | 5/2008 | Lee et al. |
| 7,376,308 B2 | 5/2008 | Cheben et al. |
| 7,377,678 B2 | 5/2008 | Huang et al. |
| 7,380,969 B2 | 6/2008 | Yamashita et al. |
| 7,380,970 B2 | 6/2008 | Hwang et al. |
| 7,385,748 B2 | 6/2008 | Miles |
| 7,388,181 B2 | 6/2008 | Han et al. |
| 7,388,706 B2 | 6/2008 | Miles |
| 7,389,476 B2 | 6/2008 | Senda et al. |
| 7,400,439 B2 | 7/2008 | Holman |
| 7,403,180 B1 | 7/2008 | Silverstein et al. |
| 7,417,735 B2 | 8/2008 | Cummings |
| 7,417,784 B2 | 8/2008 | Sasagawa |
| 7,420,638 B2 | 9/2008 | Tasaka et al. |
| 7,420,725 B2 | 9/2008 | Kothari |
| 7,450,295 B2 | 11/2008 | Tung |
| 7,456,805 B2 | 11/2008 | Ouderkirk et al. |
| 7,463,421 B2 | 12/2008 | Miles |
| 7,477,809 B1 | 1/2009 | Tan et al. |
| 7,494,830 B2 | 2/2009 | Liu et al. |
| 7,498,621 B2 | 3/2009 | Seitz |
| 7,502,081 B2 | 3/2009 | Umemoto et al. |
| 7,508,571 B2 | 3/2009 | Gally |
| 7,515,336 B2 | 4/2009 | Lippey et al. |
| 7,520,642 B2 | 4/2009 | Holman et al. |
| 7,532,800 B2 | 5/2009 | Iimura |
| 7,545,569 B2 | 6/2009 | Cassarly |
| 7,557,935 B2 | 7/2009 | Baruch |
| 7,561,323 B2 | 7/2009 | Gally |
| 7,564,612 B2 | 7/2009 | Chui |
| 7,603,001 B2 | 10/2009 | Wang |
| 7,630,114 B2 | 12/2009 | Wang et al. |
| 7,630,123 B2 | 12/2009 | Kothari |
| 7,643,203 B2 | 1/2010 | Gousev et al. |
| 7,663,714 B2 | 2/2010 | Haga et al. |
| 7,684,126 B2 | 3/2010 | Eckhardt |
| 7,688,494 B2 | 3/2010 | Xu et al. |
| 7,692,844 B2 | 4/2010 | Miles |
| 7,701,029 B2 | 4/2010 | Mabuchi |
| 7,706,050 B2 | 4/2010 | Sampsell |
| 7,710,632 B2 | 5/2010 | Cummings |
| 7,710,636 B2 | 5/2010 | Chui |
| 7,719,500 B2 | 5/2010 | Chui |
| 7,719,747 B2 | 5/2010 | Tung et al. |
| 7,733,439 B2 | 6/2010 | Sampsell |
| 7,750,886 B2 | 7/2010 | Sampsell |
| 7,766,498 B2 | 8/2010 | Sampsell |
| 7,766,531 B2 | 8/2010 | Anderson et al. |
| 7,768,690 B2 | 8/2010 | Sampsell |
| 7,777,954 B2 | 8/2010 | Gruhlke |
| 7,807,488 B2 | 10/2010 | Gally |
| 7,813,026 B2 | 10/2010 | Sampsell |
| 7,813,029 B2 | 10/2010 | Kothari et al. |
| 7,843,061 B2 | 11/2010 | Poli et al. |
| 7,845,841 B2 | 12/2010 | Sampsell |
| 7,848,001 B2 | 12/2010 | Miles |
| 7,855,824 B2 | 12/2010 | Gally |
| 7,855,827 B2 | 12/2010 | Xu et al. |
| 7,864,395 B2 | 1/2011 | Chui |
| 7,872,394 B1 | 1/2011 | Gritters et al. |
| 7,876,397 B2 | 1/2011 | Krijn et al. |
| 7,898,521 B2 | 3/2011 | Gally et al. |
| 7,907,319 B2 | 3/2011 | Miles |
| 7,911,428 B2 | 3/2011 | Gally et al. |
| 7,916,378 B2 | 3/2011 | Wang |
| 7,928,928 B2 | 4/2011 | Gally et al. |
| 7,933,475 B2 | 4/2011 | Wang et al. |
| 8,045,252 B2 | 10/2011 | Chui et al. |
| 8,111,445 B2 | 2/2012 | Chui et al. |
| 8,169,689 B2 | 5/2012 | Sampsell |
| 8,300,304 B2 | 10/2012 | Gally et al. |
| 8,408,775 B1 | 4/2013 | Coleman |
| 2001/0003487 A1 | 6/2001 | Miles |
| 2001/0003504 A1 | 6/2001 | Ishihara et al. |
| 2001/0010952 A1 | 8/2001 | Abramovich |
| 2001/0019240 A1 | 9/2001 | Takahashi |
| 2001/0019380 A1 | 9/2001 | Ishihara |
| 2001/0019479 A1 | 9/2001 | Nakabayashi et al. |
| 2001/0022636 A1 | 9/2001 | Yang et al. |
| 2001/0026001 A1* | 10/2001 | Yagi .............................. 257/447 |
| 2001/0030861 A1 | 10/2001 | Oda et al. |
| 2001/0049061 A1 | 12/2001 | Nakagaki |
| 2001/0055076 A1 | 12/2001 | Ochi et al. |
| 2002/0006036 A1 | 1/2002 | Egawa et al. |
| 2002/0034071 A1 | 3/2002 | Mabuchi |
| 2002/0039155 A1 | 4/2002 | Umemoto |
| 2002/0044445 A1 | 4/2002 | Bohler et al. |
| 2002/0050286 A1 | 5/2002 | Kubota |
| 2002/0050764 A1* | 5/2002 | Koga et al. .................... 310/309 |
| 2002/0051103 A1 | 5/2002 | Faris et al. |
| 2002/0054258 A1 | 5/2002 | Kondo |
| 2002/0057399 A1 | 5/2002 | Ishitaka |
| 2002/0060907 A1 | 5/2002 | Saccomanno |
| 2002/0075245 A1 | 6/2002 | Kawashima |
| 2002/0075555 A1 | 6/2002 | Miles |
| 2002/0080465 A1 | 6/2002 | Han |
| 2002/0081089 A1* | 6/2002 | Min et al. ....................... 385/140 |
| 2002/0106182 A1 | 8/2002 | Kawashima |
| 2002/0131151 A1 | 9/2002 | Engler et al. |
| 2002/0149584 A1 | 10/2002 | Simpson |
| 2002/0153486 A1* | 10/2002 | Ishizuya et al. ............. 250/338.1 |
| 2002/0154256 A1 | 10/2002 | Gotoh |
| 2002/0167730 A1 | 11/2002 | Needham et al. |
| 2002/0172039 A1 | 11/2002 | Inditsky |
| 2002/0172810 A1 | 11/2002 | Murata et al. |
| 2002/0176035 A1 | 11/2002 | Yamazaki |
| 2003/0001985 A1 | 1/2003 | Doe |
| 2003/0006730 A1 | 1/2003 | Tachibana |
| 2003/0011864 A1 | 1/2003 | Flanders |
| 2003/0012009 A1 | 1/2003 | Suzuki et al. |
| 2003/0016930 A1 | 1/2003 | Inditsky |
| 2003/0030764 A1 | 2/2003 | Lee |
| 2003/0058069 A1 | 3/2003 | Schwartz et al. |
| 2003/0067760 A1 | 4/2003 | Jagt et al. |
| 2003/0071947 A1 | 4/2003 | Shiraogawa et al. |
| 2003/0081154 A1 | 5/2003 | Coleman et al. |
| 2003/0083429 A1 | 5/2003 | Smith |
| 2003/0086030 A1 | 5/2003 | Taniguchi et al. |
| 2003/0086031 A1 | 5/2003 | Taniguchi et al. |
| 2003/0095401 A1 | 5/2003 | Hanson et al. |
| 2003/0098957 A1 | 5/2003 | Haldiman |
| 2003/0099118 A1 | 5/2003 | Saitoh et al. |
| 2003/0103177 A1 | 6/2003 | Maeda et al. |
| 2003/0103344 A1 | 6/2003 | Niida et al. |
| 2003/0107692 A1 | 6/2003 | Sekiguchi |
| 2003/0123245 A1 | 7/2003 | Parker et al. |
| 2003/0136759 A1 | 7/2003 | Mikolas |
| 2003/0137617 A1 | 7/2003 | Cornelissen et al. |
| 2003/0142247 A1 | 7/2003 | Nishiyama et al. |
| 2003/0151821 A1 | 8/2003 | Favalora |
| 2003/0161040 A1 | 8/2003 | Ishii |
| 2003/0165067 A1 | 9/2003 | Imamura et al. |
| 2003/0169385 A1 | 9/2003 | Okuwaki |
| 2003/0169386 A1 | 9/2003 | Goto et al. |
| 2003/0184690 A1 | 10/2003 | Ogiwara |
| 2003/0193630 A1 | 10/2003 | Chiou |
| 2003/0206281 A1 | 11/2003 | Jain |
| 2003/0210222 A1 | 11/2003 | Ogiwara et al. |
| 2003/0210363 A1 | 11/2003 | Yasukawa |
| 2003/0210366 A1 | 11/2003 | Huang et al. |
| 2003/0210367 A1 | 11/2003 | Nakano et al. |
| 2003/0213514 A1 | 11/2003 | Ortabasi |
| 2003/0214621 A1 | 11/2003 | Kim et al. |
| 2003/0222857 A1 | 12/2003 | Abileah |
| 2003/0222980 A1 | 12/2003 | Miyagaki et al. |
| 2003/0231483 A1 | 12/2003 | Higashiyama |
| 2004/0001169 A1 | 1/2004 | Saiki |
| 2004/0017599 A1 | 1/2004 | Yang |
| 2004/0027339 A1 | 2/2004 | Schulz |
| 2004/0032401 A1 | 2/2004 | Nakazawa |
| 2004/0032659 A1 | 2/2004 | Drinkwater |

(56) References Cited

U.S. PATENT DOCUMENTS

| | | |
|---|---|---|
| 2004/0042233 A1 | 3/2004 | Suzuki et al. |
| 2004/0051929 A1 | 3/2004 | Sampsell et al. |
| 2004/0061946 A1 | 4/2004 | Yoshikawa et al. |
| 2004/0066477 A1 | 4/2004 | Morimoto et al. |
| 2004/0071937 A1 | 4/2004 | Chien et al. |
| 2004/0080807 A1 | 4/2004 | Chen et al. |
| 2004/0085748 A1 | 5/2004 | Sugiura |
| 2004/0100796 A1 | 5/2004 | Ward |
| 2004/0109303 A1 | 6/2004 | Olczak |
| 2004/0109305 A1 | 6/2004 | Chisholm et al. |
| 2004/0114242 A1 | 6/2004 | Sharp |
| 2004/0115339 A1 | 6/2004 | Ito |
| 2004/0125048 A1 | 7/2004 | Fukuda et al. |
| 2004/0135494 A1 | 7/2004 | Miyatake |
| 2004/0170373 A1 | 9/2004 | Kim |
| 2004/0174583 A1 | 9/2004 | Chen et al. |
| 2004/0175577 A1 | 9/2004 | Lin et al. |
| 2004/0188150 A1 | 9/2004 | Richard et al. |
| 2004/0188599 A1 | 9/2004 | Viktorovitch |
| 2004/0207605 A1 | 10/2004 | Mackey et al. |
| 2004/0207995 A1 | 10/2004 | Park et al. |
| 2004/0217264 A1 | 11/2004 | Wood et al. |
| 2004/0217919 A1 | 11/2004 | Piehl et al. |
| 2004/0228109 A1 | 11/2004 | Leu et al. |
| 2004/0228112 A1 | 11/2004 | Takata |
| 2004/0233357 A1 | 11/2004 | Fujimori |
| 2004/0246743 A1 | 12/2004 | Lee |
| 2004/0248524 A1 | 12/2004 | Flegeo |
| 2005/0002082 A1 | 1/2005 | Miles |
| 2005/0002175 A1 | 1/2005 | Matsui et al. |
| 2005/0010568 A1 | 1/2005 | Nagatomo |
| 2005/0024557 A1 | 2/2005 | Lin |
| 2005/0024849 A1 | 2/2005 | Parker et al. |
| 2005/0024890 A1 | 2/2005 | Yamamoto et al. |
| 2005/0035699 A1 | 2/2005 | Tsai |
| 2005/0036095 A1 | 2/2005 | Yeh et al. |
| 2005/0041175 A1 | 2/2005 | Akiyama et al. |
| 2005/0042117 A1 | 2/2005 | Lin |
| 2005/0046011 A1 | 3/2005 | Chen et al. |
| 2005/0057442 A1 | 3/2005 | Way |
| 2005/0069209 A1 | 3/2005 | Damera-Venkata et al. |
| 2005/0069254 A1 | 3/2005 | Schultheis et al. |
| 2005/0073507 A1 | 4/2005 | Richter et al. |
| 2005/0088719 A1 | 4/2005 | Patel et al. |
| 2005/0099792 A1 | 5/2005 | Matsui et al. |
| 2005/0101059 A1 | 5/2005 | Yang et al. |
| 2005/0117088 A1 | 6/2005 | Van Der Wel |
| 2005/0117623 A1 | 6/2005 | Shchukin et al. |
| 2005/0120553 A1 | 6/2005 | Brown et al. |
| 2005/0133761 A1 | 6/2005 | Thielemans |
| 2005/0141065 A1 | 6/2005 | Masamoto |
| 2005/0146897 A1 | 7/2005 | Mimura |
| 2005/0180145 A1 | 8/2005 | Okuwaki |
| 2005/0195175 A1 | 9/2005 | Anderson |
| 2005/0195370 A1 | 9/2005 | Gore et al. |
| 2005/0195462 A1 | 9/2005 | Lin |
| 2005/0206802 A1 | 9/2005 | Creemers |
| 2005/0207016 A1 | 9/2005 | Ando |
| 2005/0213346 A1 | 9/2005 | Kao et al. |
| 2005/0224694 A1 | 10/2005 | Yaung |
| 2005/0225686 A1 | 10/2005 | Brummack et al. |
| 2005/0231977 A1 | 10/2005 | Hayakawa |
| 2005/0231981 A1 | 10/2005 | Hoelen et al. |
| 2005/0242693 A1 | 11/2005 | Hayashi et al. |
| 2005/0248524 A1 | 11/2005 | Feng et al. |
| 2005/0248698 A1 | 11/2005 | Okamoto et al. |
| 2005/0259302 A9 | 11/2005 | Metz et al. |
| 2005/0259939 A1 | 11/2005 | Rinko |
| 2005/0271325 A1 | 12/2005 | Anderson et al. |
| 2006/0002141 A1 | 1/2006 | Ouderkirk et al. |
| 2006/0002655 A1 | 1/2006 | Smits |
| 2006/0002675 A1 | 1/2006 | Choi et al. |
| 2006/0007510 A1 | 1/2006 | Nishide et al. |
| 2006/0012733 A1 | 1/2006 | Jin et al. |
| 2006/0012739 A1 | 1/2006 | Shibazaki |
| 2006/0022966 A1 | 2/2006 | Mar |
| 2006/0024017 A1 | 2/2006 | Page et al. |
| 2006/0024880 A1 | 2/2006 | Chui et al. |
| 2006/0044523 A1 | 3/2006 | Teijido et al. |
| 2006/0044928 A1 | 3/2006 | Chui et al. |
| 2006/0050032 A1 | 3/2006 | Gunner et al. |
| 2006/0051048 A1 | 3/2006 | Gardiner et al. |
| 2006/0056000 A1 | 3/2006 | Mignard |
| 2006/0056166 A1 | 3/2006 | Yeo et al. |
| 2006/0061705 A1 | 3/2006 | Onishi |
| 2006/0062016 A1 | 3/2006 | Dejima et al. |
| 2006/0065940 A1 | 3/2006 | Kothari |
| 2006/0066503 A1 | 3/2006 | Sampsell et al. |
| 2006/0066504 A1 | 3/2006 | Sampsell et al. |
| 2006/0066557 A1 | 3/2006 | Floyd |
| 2006/0066560 A1 | 3/2006 | Gally et al. |
| 2006/0066586 A1 | 3/2006 | Gally |
| 2006/0066595 A1 | 3/2006 | Sampsell et al. |
| 2006/0066596 A1 | 3/2006 | Sampsell et al. |
| 2006/0066598 A1 | 3/2006 | Floyd |
| 2006/0066600 A1 | 3/2006 | Palmateer |
| 2006/0066601 A1 | 3/2006 | Kothari et al. |
| 2006/0066641 A1 | 3/2006 | Gally et al. |
| 2006/0066863 A1 | 3/2006 | Cummings et al. |
| 2006/0066936 A1 | 3/2006 | Chui et al. |
| 2006/0066937 A1 | 3/2006 | Chui |
| 2006/0066938 A1 | 3/2006 | Chui |
| 2006/0067028 A1 | 3/2006 | Floyd |
| 2006/0072315 A1 | 4/2006 | Han et al. |
| 2006/0072339 A1 | 4/2006 | Li et al. |
| 2006/0076631 A1 | 4/2006 | Palmateer et al. |
| 2006/0076632 A1 | 4/2006 | Palmateer et al. |
| 2006/0077124 A1 | 4/2006 | Gally |
| 2006/0077126 A1 | 4/2006 | Kothari |
| 2006/0077127 A1 | 4/2006 | Sampsell et al. |
| 2006/0077146 A1 | 4/2006 | Palmateer |
| 2006/0077148 A1 | 4/2006 | Gally et al. |
| 2006/0077149 A1 | 4/2006 | Gally et al. |
| 2006/0077504 A1 | 4/2006 | Floyd |
| 2006/0077505 A1 | 4/2006 | Chui et al. |
| 2006/0077518 A1 | 4/2006 | Chui et al. |
| 2006/0077520 A1 | 4/2006 | Chui et al. |
| 2006/0077521 A1 | 4/2006 | Gally et al. |
| 2006/0077523 A1 | 4/2006 | Cummings et al. |
| 2006/0077524 A1 | 4/2006 | Palmateer |
| 2006/0077528 A1 | 4/2006 | Floyd |
| 2006/0077529 A1 | 4/2006 | Chui et al. |
| 2006/0077533 A1 | 4/2006 | Miles et al. |
| 2006/0077617 A1 | 4/2006 | Floyd |
| 2006/0079048 A1 | 4/2006 | Sampsell |
| 2006/0083028 A1 | 4/2006 | Sun et al. |
| 2006/0091824 A1 | 5/2006 | Pate et al. |
| 2006/0103613 A1 | 5/2006 | Chui |
| 2006/0103643 A1 | 5/2006 | Mathew et al. |
| 2006/0103912 A1 | 5/2006 | Katoh et al. |
| 2006/0109682 A1 | 5/2006 | Ko et al. |
| 2006/0109686 A1 | 5/2006 | Sugiura |
| 2006/0110090 A1 | 5/2006 | Ellwood, Jr. |
| 2006/0114244 A1 | 6/2006 | Saxena et al. |
| 2006/0126142 A1 | 6/2006 | Choi |
| 2006/0130889 A1 | 6/2006 | Li et al. |
| 2006/0132383 A1 | 6/2006 | Gally |
| 2006/0164861 A1 | 7/2006 | Maeda et al. |
| 2006/0176241 A1 | 8/2006 | Sampsell |
| 2006/0176487 A1 | 8/2006 | Cummings et al. |
| 2006/0181903 A1 | 8/2006 | Okuwaki |
| 2006/0187676 A1 | 8/2006 | Ishikura |
| 2006/0193582 A1 | 8/2006 | Ouderkirk et al. |
| 2006/0198013 A1 | 9/2006 | Sampsell |
| 2006/0209012 A1 | 9/2006 | Hagood |
| 2006/0209385 A1 | 9/2006 | Liu et al. |
| 2006/0215958 A1 | 9/2006 | Yeo et al. |
| 2006/0227532 A1 | 10/2006 | Ko et al. |
| 2006/0246233 A1 | 11/2006 | Fukuda |
| 2006/0250335 A1 | 11/2006 | Stewart et al. |
| 2006/0250350 A1 | 11/2006 | Kothari et al. |
| 2006/0250676 A1 | 11/2006 | Hagood, IV et al. |
| 2006/0262562 A1 | 11/2006 | Fukasawa et al. |
| 2006/0265919 A1 | 11/2006 | Huang |

(56) References Cited

U.S. PATENT DOCUMENTS

| | | |
|---|---|---|
| 2006/0268574 A1 | 11/2006 | Jung et al. |
| 2006/0274243 A1 | 12/2006 | Iijima et al. |
| 2006/0279558 A1 | 12/2006 | Van Delden et al. |
| 2006/0285356 A1 | 12/2006 | Tseng |
| 2006/0286381 A1 | 12/2006 | Naito et al. |
| 2006/0290253 A1 | 12/2006 | Yeo et al. |
| 2006/0291769 A1 | 12/2006 | Spoonhower et al. |
| 2007/0018585 A1 | 1/2007 | Ijzerman et al. |
| 2007/0036492 A1 | 2/2007 | Lee |
| 2007/0042524 A1 | 2/2007 | Kogut et al. |
| 2007/0064294 A1 | 3/2007 | Hoshino et al. |
| 2007/0070270 A1 | 3/2007 | Yu et al. |
| 2007/0097694 A1 | 5/2007 | Faase et al. |
| 2007/0114523 A1 | 5/2007 | Oumi et al. |
| 2007/0116424 A1 | 5/2007 | Ting et al. |
| 2007/0125415 A1 | 6/2007 | Sachs |
| 2007/0132843 A1 | 6/2007 | Miles |
| 2007/0133935 A1 | 6/2007 | Fine |
| 2007/0134438 A1 | 6/2007 | Fabick et al. |
| 2007/0146887 A1 | 6/2007 | Ikeda et al. |
| 2007/0147087 A1 | 6/2007 | Parker et al. |
| 2007/0171330 A1 | 7/2007 | Hung et al. |
| 2007/0187852 A1 | 8/2007 | Parker et al. |
| 2007/0189036 A1 | 8/2007 | Chen et al. |
| 2007/0201056 A1 | 8/2007 | Cok et al. |
| 2007/0201234 A1 | 8/2007 | Ottermann |
| 2007/0210163 A1 | 9/2007 | Han |
| 2007/0229737 A1 | 10/2007 | Takeda |
| 2007/0229936 A1 | 10/2007 | Miles |
| 2007/0241340 A1 | 10/2007 | Pan |
| 2007/0247704 A1 | 10/2007 | Mignard |
| 2007/0253054 A1 | 11/2007 | Miles |
| 2007/0268695 A1 | 11/2007 | Seetzen |
| 2007/0279727 A1 | 12/2007 | Gandhi et al. |
| 2007/0279935 A1 | 12/2007 | Gardiner et al. |
| 2007/0291362 A1 | 12/2007 | Hill et al. |
| 2007/0292091 A1 | 12/2007 | Fujii et al. |
| 2008/0030650 A1 | 2/2008 | Kitagawa et al. |
| 2008/0037281 A1 | 2/2008 | Chang |
| 2008/0042154 A1 | 2/2008 | Wano |
| 2008/0084600 A1 | 4/2008 | Bita et al. |
| 2008/0089063 A1 | 4/2008 | Chen |
| 2008/0090025 A1 | 4/2008 | Freking et al. |
| 2008/0094853 A1 | 4/2008 | Kim et al. |
| 2008/0112039 A1 | 5/2008 | Chui |
| 2008/0151347 A1 | 6/2008 | Chui |
| 2008/0170414 A1 | 7/2008 | Wang |
| 2008/0192259 A1 | 8/2008 | Sumiyama |
| 2008/0192484 A1 | 8/2008 | Lee et al. |
| 2008/0232135 A1 | 9/2008 | Kinder et al. |
| 2008/0239216 A1 | 10/2008 | Miyamoto et al. |
| 2008/0266333 A1 | 10/2008 | Silverstein et al. |
| 2008/0278796 A1 | 11/2008 | Roosendaal et al. |
| 2008/0285307 A1 | 11/2008 | Aylward et al. |
| 2008/0285308 A1 | 11/2008 | Clary et al. |
| 2009/0050454 A1 | 2/2009 | Matsukawa et al. |
| 2009/0059346 A1 | 3/2009 | Xu |
| 2009/0073540 A1 | 3/2009 | Kothari et al. |
| 2009/0086301 A1 | 4/2009 | Gally et al. |
| 2009/0086466 A1 | 4/2009 | Sugita et al. |
| 2009/0090611 A1 | 4/2009 | Zeijlon et al. |
| 2009/0096956 A1 | 4/2009 | Uehara et al. |
| 2009/0097100 A1 | 4/2009 | Gally |
| 2009/0101192 A1 | 4/2009 | Kothari et al. |
| 2009/0101623 A1 | 4/2009 | Bita et al. |
| 2009/0103161 A1 | 4/2009 | Kothari et al. |
| 2009/0103165 A1 | 4/2009 | Kothari et al. |
| 2009/0103166 A1 | 4/2009 | Khazeni et al. |
| 2009/0103311 A1 | 4/2009 | Wu et al. |
| 2009/0126777 A1 | 5/2009 | Khazeni et al. |
| 2009/0126792 A1 | 5/2009 | Gruhlke |
| 2009/0147332 A1 | 6/2009 | Bita et al. |
| 2009/0147535 A1 | 6/2009 | Mienko |
| 2009/0151771 A1 | 6/2009 | Kothari et al. |
| 2009/0168459 A1 | 7/2009 | Holman et al. |
| 2009/0190373 A1 | 7/2009 | Bita et al. |
| 2009/0196068 A1 | 8/2009 | Wang et al. |
| 2009/0199893 A1 | 8/2009 | Bita et al. |
| 2009/0199900 A1 | 8/2009 | Bita et al. |
| 2009/0201301 A1 | 8/2009 | Mienko et al. |
| 2009/0201565 A1 | 8/2009 | Bita et al. |
| 2009/0201571 A1 | 8/2009 | Gally |
| 2009/0213298 A1 | 8/2009 | Mimura |
| 2009/0225394 A1 | 9/2009 | Chui et al. |
| 2009/0225396 A1 | 9/2009 | Sampsell |
| 2009/0231275 A1 | 9/2009 | Odgers |
| 2009/0231877 A1 | 9/2009 | Mienko et al. |
| 2009/0242024 A1 | 10/2009 | Kothari et al. |
| 2009/0244690 A1 | 10/2009 | Lee |
| 2009/0251752 A1 | 10/2009 | Gruhlke |
| 2009/0255569 A1 | 10/2009 | Sampsell et al. |
| 2009/0257108 A1 | 10/2009 | Gruhlke et al. |
| 2009/0293955 A1 | 12/2009 | Kothari et al. |
| 2009/0293995 A1 | 12/2009 | Tanaka et al. |
| 2009/0294785 A1 | 12/2009 | Cok |
| 2009/0296193 A1 | 12/2009 | Bita et al. |
| 2009/0296194 A1 | 12/2009 | Gally |
| 2009/0303417 A1 | 12/2009 | Mizushima et al. |
| 2009/0323144 A1 | 12/2009 | Gruhlke et al. |
| 2009/0323153 A1 | 12/2009 | Sampsell |
| 2010/0026727 A1 | 2/2010 | Bita et al. |
| 2010/0033988 A1 | 2/2010 | Chiu et al. |
| 2010/0039832 A1 | 2/2010 | Ahlgren et al. |
| 2010/0052880 A1 | 3/2010 | Laitinen et al. |
| 2010/0096006 A1 | 4/2010 | Griffiths et al. |
| 2010/0096011 A1 | 4/2010 | Griffiths et al. |
| 2010/0110340 A1 | 5/2010 | Mather et al. |
| 2010/0118239 A1 | 5/2010 | Roosendaal et al. |
| 2010/0141557 A1 | 6/2010 | Gruhlke |
| 2010/0149624 A1 | 6/2010 | Kothari |
| 2010/0165443 A1 | 7/2010 | Chui |
| 2010/0172012 A1 | 7/2010 | Sampsell |
| 2010/0182308 A1 | 7/2010 | Holman et al. |
| 2010/0188367 A1 | 7/2010 | Nagafuji et al. |
| 2010/0195310 A1 | 8/2010 | Baar |
| 2010/0214642 A1 | 8/2010 | Miles |
| 2010/0226118 A1 | 9/2010 | Baar |
| 2010/0238529 A1 | 9/2010 | Sampsell et al. |
| 2010/0245370 A1 | 9/2010 | Narayanan et al. |
| 2010/0245975 A1 | 9/2010 | Cummings |
| 2010/0278480 A1 | 11/2010 | Vasylyev |
| 2010/0302185 A1 | 12/2010 | Han et al. |
| 2010/0302616 A1 | 12/2010 | Bita et al. |
| 2010/0302802 A1 | 12/2010 | Bita |
| 2010/0302803 A1 | 12/2010 | Bita et al. |
| 2010/0309103 A1 | 12/2010 | Sampsell |
| 2010/0309540 A1 | 12/2010 | Miles |
| 2011/0025727 A1 | 2/2011 | Li |
| 2011/0032214 A1 | 2/2011 | Gruhlke et al. |
| 2011/0043889 A1 | 2/2011 | Mignard |
| 2011/0075246 A1 | 3/2011 | Wang |
| 2011/0157058 A1 | 6/2011 | Bita et al. |
| 2011/0157093 A1 | 6/2011 | Bita et al. |
| 2011/0199667 A1 | 8/2011 | Wang et al. |
| 2011/0199669 A1 | 8/2011 | Chui |
| 2011/0316861 A1 | 12/2011 | Gally et al. |
| 2012/0002265 A1 | 1/2012 | Kothari |
| 2012/0057107 A1 | 3/2012 | Kitagawa et al. |
| 2012/0069031 A1 | 3/2012 | Bita et al. |
| 2012/0081406 A1 | 4/2012 | Li et al. |
| 2012/0099177 A1 | 4/2012 | Chui et al. |
| 2012/0154881 A1 | 6/2012 | Gruhlke et al. |
| 2012/0206788 A1 | 8/2012 | Sampsell |
| 2013/0106712 A1 | 5/2013 | Cummings et al. |
| 2013/0127922 A1 | 5/2013 | Poliakov et al. |

FOREIGN PATENT DOCUMENTS

| | | |
|---|---|---|
| CN | 1272922 | 11/2000 |
| CN | 1286424 | 3/2001 |
| CN | 1381752 A | 11/2002 |
| CN | 1384392 A | 12/2002 |
| CN | 1409157 A | 4/2003 |
| CN | 1420703 A | 5/2003 |

(56) References Cited

FOREIGN PATENT DOCUMENTS

| | | |
|---|---|---|
| CN | 1447887 | 10/2003 |
| CN | 2624220 Y | 7/2004 |
| CN | 1517743 A | 8/2004 |
| CN | 1559000 A | 12/2004 |
| CN | 1639596 | 7/2005 |
| CN | 1643439 A | 7/2005 |
| CN | 1670593 A | 9/2005 |
| CN | 1744163 A | 3/2006 |
| CN | 1755494 A | 4/2006 |
| CN | 1795403 | 6/2006 |
| CN | 1811549 | 8/2006 |
| DE | 34 02 746 | 8/1985 |
| DE | 196 22 748 | 12/1997 |
| DE | 19942513 A1 | 3/2001 |
| DE | 102 28 946 | 1/2004 |
| DE | 10329917 | 2/2005 |
| DE | 102007025092 A1 | 12/2008 |
| EP | 0223136 A2 | 5/1987 |
| EP | 0 278 038 | 8/1988 |
| EP | 0389031 A1 | 9/1990 |
| EP | 0539099 A2 | 4/1993 |
| EP | 0590511 A1 | 4/1994 |
| EP | 0621500 A1 | 10/1994 |
| EP | 0 667 548 | 8/1995 |
| EP | 0786911 A2 | 7/1997 |
| EP | 0 822 441 | 2/1998 |
| EP | 0830032 A2 | 3/1998 |
| EP | 0855745 A2 | 7/1998 |
| EP | 0867747 A2 | 9/1998 |
| EP | 0 879 991 | 11/1998 |
| EP | 0895274 A1 | 2/1999 |
| EP | 0907050 A1 | 4/1999 |
| EP | 0 957 392 | 11/1999 |
| EP | 0984314 A2 | 3/2000 |
| EP | 1003062 A1 | 5/2000 |
| EP | 1014161 A1 | 6/2000 |
| EP | 1 081 633 | 3/2001 |
| EP | 1089115 A1 | 4/2001 |
| EP | 1093105 A1 | 4/2001 |
| EP | 1113218 A1 | 7/2001 |
| EP | 1116987 A2 | 7/2001 |
| EP | 1 122 586 | 8/2001 |
| EP | 1127984 A1 | 8/2001 |
| EP | 1143270 A2 | 10/2001 |
| EP | 1 199 512 | 4/2002 |
| EP | 1231757 A2 | 8/2002 |
| EP | 1251454 A2 | 10/2002 |
| EP | 1 279 892 | 1/2003 |
| EP | 1271223 A2 | 1/2003 |
| EP | 1296094 A1 | 3/2003 |
| EP | 1298635 A2 | 4/2003 |
| EP | 1306609 A1 | 5/2003 |
| EP | 1 329 664 | 7/2003 |
| EP | 1336876 A1 | 8/2003 |
| EP | 1 347 315 | 9/2003 |
| EP | 1341025 A1 | 9/2003 |
| EP | 1389775 A2 | 2/2004 |
| EP | 1413543 A1 | 4/2004 |
| EP | 1437610 A1 | 7/2004 |
| EP | 1445629 A1 | 8/2004 |
| EP | 1450418 A2 | 8/2004 |
| EP | 1519218 A1 | 3/2005 |
| EP | 1531302 A1 | 5/2005 |
| EP | 1544537 A1 | 6/2005 |
| EP | 1577701 A1 | 9/2005 |
| EP | 1640314 | 3/2006 |
| EP | 1640761 A1 | 3/2006 |
| EP | 1640767 A1 | 3/2006 |
| EP | 1640776 | 3/2006 |
| EP | 1640778 | 3/2006 |
| EP | 1640779 | 3/2006 |
| EP | 1640780 | 3/2006 |
| EP | 1640961 A2 | 3/2006 |
| EP | 1670065 A1 | 6/2006 |
| EP | 1698918 A1 | 9/2006 |
| EP | 1734401 A1 | 12/2006 |
| EP | 1748305 A1 | 1/2007 |
| EP | 1780585 A2 | 5/2007 |
| EP | 1800183 | 6/2007 |
| EP | 1947551 A2 | 7/2008 |
| EP | 2051124 A2 | 4/2009 |
| EP | 2068180 A1 | 6/2009 |
| EP | 2068181 A1 | 6/2009 |
| EP | 1640337 | 10/2009 |
| EP | 2 141 408 | 1/2010 |
| EP | 2163920 A1 | 3/2010 |
| EP | 2251731 A1 | 11/2010 |
| EP | 2259122 | 12/2010 |
| EP | 2259123 | 12/2010 |
| EP | 2264508 | 12/2010 |
| EP | 2264509 | 12/2010 |
| EP | 2264510 | 12/2010 |
| EP | 1640313 | 2/2011 |
| EP | 1640764 | 4/2011 |
| EP | 2366942 | 9/2011 |
| EP | 2366943 | 9/2011 |
| EP | 2366944 | 9/2011 |
| EP | 2366945 | 9/2011 |
| EP | 2366946 | 9/2011 |
| EP | 2388234 A1 | 11/2011 |
| EP | 1640770 | 4/2012 |
| GB | 2 260 203 | 4/1993 |
| GB | 2 278 222 | 11/1994 |
| GB | 2315356 A | 1/1998 |
| GB | 2321532 A | 7/1998 |
| GB | 2331615 | 5/1999 |
| GB | 2336933 | 11/1999 |
| GB | 2340281 | 2/2000 |
| GB | 2351834 A | 1/2001 |
| JP | 56010976 | 2/1981 |
| JP | 56010977 | 2/1981 |
| JP | 56088111 | 7/1981 |
| JP | 573266 | 1/1982 |
| JP | 58115781 | 7/1983 |
| JP | 60147718 | 8/1985 |
| JP | 60165621 A | 8/1985 |
| JP | 60242408 A | 12/1985 |
| JP | 62 009317 | 1/1987 |
| JP | S6395489 A | 4/1988 |
| JP | 02 068513 | 3/1990 |
| JP | 02151079 | 6/1990 |
| JP | 03-199920 | 8/1991 |
| JP | 04 081816 | 3/1992 |
| JP | 4053220 U | 5/1992 |
| JP | 04190323 | 7/1992 |
| JP | 04238321 | 8/1992 |
| JP | 05 281479 | 10/1993 |
| JP | 6209114 A | 7/1994 |
| JP | 6265870 A | 9/1994 |
| JP | 07-509327 | 10/1995 |
| JP | 08 018990 | 1/1996 |
| JP | 8050283 A | 2/1996 |
| JP | 08094992 | 4/1996 |
| JP | 9-307140 | * 5/1996 ............. H01L 33/00 |
| JP | 08 271874 | 10/1996 |
| JP | 09 022012 | 1/1997 |
| JP | 9005735 A | 1/1997 |
| JP | 09068722 | 3/1997 |
| JP | 09160032 | 6/1997 |
| JP | 9171111 A | 6/1997 |
| JP | 09 189869 | 7/1997 |
| JP | 09189910 A | 7/1997 |
| JP | 09-507920 | 8/1997 |
| JP | 9230324 A | 9/1997 |
| JP | 09260696 | 10/1997 |
| JP | 09281917 | 10/1997 |
| JP | 09-307140 | 11/1997 |
| JP | 09 307140 | 11/1997 |
| JP | 09311333 | 12/1997 |
| JP | 10 500224 | 1/1998 |
| JP | 10096910 A | 4/1998 |
| JP | 10186249 A | 7/1998 |
| JP | 10202948 | 8/1998 |
| JP | 10325953 A | 12/1998 |

(56) References Cited

FOREIGN PATENT DOCUMENTS

| | | |
|---|---|---|
| JP | H10326515 A | 12/1998 |
| JP | 11002712 A | 1/1999 |
| JP | 11002764 A | 1/1999 |
| JP | 11052887 A | 2/1999 |
| JP | 11 064882 | 3/1999 |
| JP | 11064836 A | 3/1999 |
| JP | 11072721 A | 3/1999 |
| JP | 11 160687 | 6/1999 |
| JP | 11-160687 * | 6/1999 ............ G02F 1/1333 |
| JP | 11167808 A | 6/1999 |
| JP | 411160687 A * | 6/1999 ............ G02F 1/1333 |
| JP | 11 174234 | 7/1999 |
| JP | 11184387 A | 7/1999 |
| JP | 11 211999 | 8/1999 |
| JP | 11231321 A | 8/1999 |
| JP | 11232919 | 8/1999 |
| JP | 11 258558 | 9/1999 |
| JP | 11249132 A | 9/1999 |
| JP | 11254752 A | 9/1999 |
| JP | 11295725 | 10/1999 |
| JP | 11295726 A | 10/1999 |
| JP | 11 326903 | 11/1999 |
| JP | 11316553 A | 11/1999 |
| JP | 11326898 A | 11/1999 |
| JP | 2000 500245 | 1/2000 |
| JP | 2000028933 A | 1/2000 |
| JP | 2000 089225 | 3/2000 |
| JP | 2000075287 A | 3/2000 |
| JP | 2000075293 A | 3/2000 |
| JP | 2000081848 | 3/2000 |
| JP | 2000147262 A | 5/2000 |
| JP | 2000181367 | 6/2000 |
| JP | 2000193933 A | 7/2000 |
| JP | 2000214804 A | 8/2000 |
| JP | 2000258622 A | 9/2000 |
| JP | 2000 514568 | 10/2000 |
| JP | 2000 305074 | 11/2000 |
| JP | 2000314882 A | 11/2000 |
| JP | 2000 338310 | 12/2000 |
| JP | 2001021883 | 1/2001 |
| JP | 2001110218 A | 4/2001 |
| JP | 2001222276 A | 8/2001 |
| JP | 2001 305312 | 10/2001 |
| JP | 2001283622 A | 10/2001 |
| JP | 2001297615 A | 10/2001 |
| JP | 2001324606 A | 11/2001 |
| JP | 2001 343514 | 12/2001 |
| JP | 2001345458 | 12/2001 |
| JP | 2002014344 A | 1/2002 |
| JP | 2002040339 A | 2/2002 |
| JP | 2002042525 A | 2/2002 |
| JP | 2002062505 A | 2/2002 |
| JP | 2002 071965 | 3/2002 |
| JP | 2002072284 A | 3/2002 |
| JP | 2002090549 | 3/2002 |
| JP | 2002098838 A | 4/2002 |
| JP | 2002108227 | 4/2002 |
| JP | 2002124113 A | 4/2002 |
| JP | 2002 139630 | 5/2002 |
| JP | 2002131551 A | 5/2002 |
| JP | 2002 174780 | 6/2002 |
| JP | 2002196151 A | 7/2002 |
| JP | 2002208307 A | 7/2002 |
| JP | 2002523798 | 7/2002 |
| JP | 2002 236290 | 8/2002 |
| JP | 2002229023 A | 8/2002 |
| JP | 2002245835 A | 8/2002 |
| JP | 2002 287047 | 10/2002 |
| JP | 2002-297044 | 10/2002 |
| JP | 2002 328313 | 11/2002 |
| JP | 2002365438 A | 12/2002 |
| JP | 2003004950 A | 1/2003 |
| JP | 2003007114 A | 1/2003 |
| JP | 2003021821 A | 1/2003 |
| JP | 2003057652 | 2/2003 |
| JP | 2003057653 A | 2/2003 |
| JP | 2003 066236 | 3/2003 |
| JP | 2003 066451 | 3/2003 |
| JP | 2003131215 | 5/2003 |
| JP | 2003140118 A | 5/2003 |
| JP | 2003147351 A | 5/2003 |
| JP | 2003149642 | 5/2003 |
| JP | 2003149643 | 5/2003 |
| JP | 2003 177405 | 6/2003 |
| JP | 2003173713 A | 6/2003 |
| JP | 2003177336 A | 6/2003 |
| JP | 2003 202568 | 7/2003 |
| JP | 2003186008 A | 7/2003 |
| JP | 2003188959 A | 7/2003 |
| JP | 2003195201 A | 7/2003 |
| JP | 2003 222861 | 8/2003 |
| JP | 2003 248181 | 9/2003 |
| JP | 2003 255140 | 9/2003 |
| JP | 2003255344 A | 9/2003 |
| JP | 2003262867 A | 9/2003 |
| JP | 2003 315560 | 11/2003 |
| JP | 2003315694 A | 11/2003 |
| JP | 2003344881 | 12/2003 |
| JP | 2004-012918 | 1/2004 |
| JP | 2004006003 A | 1/2004 |
| JP | 2004-062099 | 2/2004 |
| JP | 2004 086221 | 3/2004 |
| JP | 2004070189 A | 3/2004 |
| JP | 2004087409 A | 3/2004 |
| JP | 2004-510185 | 4/2004 |
| JP | 2004111278 A | 4/2004 |
| JP | 2004126196 A | 4/2004 |
| JP | 2004145109 A | 5/2004 |
| JP | 2004-206049 | 7/2004 |
| JP | 2004199006 A | 7/2004 |
| JP | 2004212673 A | 7/2004 |
| JP | 2004212922 A | 7/2004 |
| JP | 2004219843 A | 8/2004 |
| JP | 2004302135 A | 10/2004 |
| JP | 2005031219 A | 2/2005 |
| JP | 2005 135899 | 5/2005 |
| JP | 2005259365 | 9/2005 |
| JP | 2005308871 A | 11/2005 |
| JP | 2005316178 | 11/2005 |
| JP | 2006039056 A | 2/2006 |
| JP | 2006065360 | 3/2006 |
| JP | 2006099061 A | 4/2006 |
| JP | 2006099105 A | 4/2006 |
| JP | 2006099113 A | 4/2006 |
| JP | 2006107993 | 4/2006 |
| JP | 2006120571 | 5/2006 |
| JP | 2006133743 A | 5/2006 |
| JP | 2006179495 A | 7/2006 |
| JP | 2007027150 A | 2/2007 |
| JP | 2007218540 A | 8/2007 |
| JP | 2008514992 | 5/2008 |
| JP | 2009300966 A | 12/2009 |
| JP | 2010156979 | 7/2010 |
| KR | 20020010322 | 2/2002 |
| KR | 10-0329769-0000 | 3/2002 |
| KR | 20030029769 | 4/2003 |
| KR | 1020030029647 | 4/2003 |
| KR | 20030081662 | 10/2003 |
| KR | 2004-0016570 | 2/2004 |
| KR | 20070109557 A | 11/2007 |
| KR | 20070117137 A | 12/2007 |
| TW | 412646 B | 11/2000 |
| TW | 520445 | 2/2003 |
| TW | 200302775 | 8/2003 |
| TW | 552720 B | 9/2003 |
| TW | 556009 B | 10/2003 |
| TW | 567388 B | 12/2003 |
| TW | 579368 B | 3/2004 |
| TW | 594155 | 6/2004 |
| TW | 200500717 | 1/2005 |
| TW | 200512518 | 4/2005 |
| WO | WO 94/06871 A1 | 3/1994 |
| WO | WO-9501584 A1 | 1/1995 |
| WO | WO 95/14256 | 5/1995 |

(56) References Cited

FOREIGN PATENT DOCUMENTS

| | | |
|---|---|---|
| WO | WO-9515582 A1 | 6/1995 |
| WO | WO 95/30924 | 11/1995 |
| WO | WO 96/08833 | 3/1996 |
| WO | WO 97/01240 | 1/1997 |
| WO | WO 97/17628 | 5/1997 |
| WO | WO-9716756 A1 | 5/1997 |
| WO | WO-9744707 A2 | 11/1997 |
| WO | WO 97/46908 | 12/1997 |
| WO | WO-9814828 A2 | 4/1998 |
| WO | WO-9819201 A1 | 5/1998 |
| WO | WO-9832047 A1 | 7/1998 |
| WO | WO-9835182 A1 | 8/1998 |
| WO | WO-9852094 A1 | 11/1998 |
| WO | WO-9904296 A1 | 1/1999 |
| WO | WO-9952006 A2 | 10/1999 |
| WO | WO-9963394 A1 | 12/1999 |
| WO | WO-9967678 A2 | 12/1999 |
| WO | WO-9967680 A1 | 12/1999 |
| WO | WO-0011502 A1 | 3/2000 |
| WO | WO-0050807 A1 | 8/2000 |
| WO | WO-0129148 A1 | 4/2001 |
| WO | WO 01/57434 | 8/2001 |
| WO | WO 01/81994 | 11/2001 |
| WO | WO 01/90637 | 11/2001 |
| WO | WO-0184228 A1 | 11/2001 |
| WO | WO-0184229 A1 | 11/2001 |
| WO | WO-0206858 A2 | 1/2002 |
| WO | WO-0224570 A1 | 3/2002 |
| WO | WO-02071132 A2 | 9/2002 |
| WO | WO-02097324 A1 | 12/2002 |
| WO | WO-03007049 | 1/2003 |
| WO | WO 03/032058 | 4/2003 |
| WO | WO-03027569 A1 | 4/2003 |
| WO | WO-03038509 A2 | 5/2003 |
| WO | WO 03/062912 | 7/2003 |
| WO | WO-03056876 A2 | 7/2003 |
| WO | WO 03/075207 | 9/2003 |
| WO | WO-03073151 A1 | 9/2003 |
| WO | WO-03105198 A1 | 12/2003 |
| WO | WO 2004/006003 | 1/2004 |
| WO | WO-2004003643 A1 | 1/2004 |
| WO | WO-2004012004 A1 | 2/2004 |
| WO | WO-2004015489 A1 | 2/2004 |
| WO | WO 2004/027514 | 4/2004 |
| WO | WO 2004/036270 | 4/2004 |
| WO | WO-2004036294 A2 | 4/2004 |
| WO | WO-2004068182 | 8/2004 |
| WO | WO-2004068460 A1 | 8/2004 |
| WO | WO-2004088372 A1 | 10/2004 |
| WO | WO-2004114418 A1 | 12/2004 |
| WO | WO-2005011012 A1 | 2/2005 |
| WO | WO 2005/076051 | 8/2005 |
| WO | WO-2005088367 A1 | 9/2005 |
| WO | WO-2005093490 | 10/2005 |
| WO | WO-2005111669 A1 | 11/2005 |
| WO | WO-2006008702 A2 | 1/2006 |
| WO | WO 2006/026743 | 3/2006 |
| WO | WO-2006036415 | 4/2006 |
| WO | WO-2006036440 | 4/2006 |
| WO | WO-2006036451 A1 | 4/2006 |
| WO | WO-2006036496 | 4/2006 |
| WO | WO-2006036519 | 4/2006 |
| WO | WO-2006036540 A1 | 4/2006 |
| WO | WO-2006036564 | 4/2006 |
| WO | WO-2006036588 | 4/2006 |
| WO | WO-2006137337 | 12/2006 |
| WO | WO-2007053308 A2 | 5/2007 |
| WO | WO-2007064133 A1 | 6/2007 |
| WO | WO-2007073203 A1 | 6/2007 |
| WO | WO 2007/094558 | 8/2007 |
| WO | WO-2007127046 | 11/2007 |
| WO | WO-2007149474 | 12/2007 |
| WO | WO-2008027275 | 3/2008 |
| WO | WO 2008/045200 | 4/2008 |
| WO | WO 2008/045207 | 4/2008 |
| WO | WO-2008039229 | 4/2008 |
| WO | WO-2008045218 A1 | 4/2008 |
| WO | WO-2008045222 A1 | 4/2008 |
| WO | WO-2008045224 | 4/2008 |
| WO | WO-2008045310 | 4/2008 |
| WO | WO-2008045311 | 4/2008 |
| WO | WO-2008045312 A1 | 4/2008 |
| WO | WO-2008045362 A2 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008069877 | 6/2008 |
| WO | WO-2008109620 | 9/2008 |
| WO | WO-2008137299 | 11/2008 |
| WO | WO-2008145096 A1 | 12/2008 |
| WO | WO-2009052324 A2 | 4/2009 |
| WO | WO-2009052326 A2 | 4/2009 |
| WO | WO-2009065069 A1 | 5/2009 |
| WO | WO-2009076075 | 6/2009 |
| WO | WO-2009085706 A2 | 7/2009 |
| WO | WO-2009102672 A2 | 8/2009 |
| WO | WO-2009102731 | 8/2009 |
| WO | WO-2009102733 | 8/2009 |
| WO | WO-2009158354 A1 | 12/2009 |
| WO | WO-2012043396 A1 | 4/2012 |

OTHER PUBLICATIONS

Office Action for U.S. Appl. No. 10/249,243, dated Dec. 14, 2004.
Response to Office Action in U.S. Appl. No. 10/249,243, dated Mar. 14, 2005.
Office Action for U.S. Appl. No. 10/249,243, dated Jun. 15, 2005.
Response to Office Action in U.S. Appl. No. 10/249,243, dated Sep. 15, 2005.
Office Action for U.S. Appl. No. 10/249,243, dated Oct. 4, 2005.
Request for Continued Examination and Preliminary Amendment in U.S. Appl. No. 10/249,243, dated Oct. 13, 2005.
Office Action for U.S. Appl. No. 10/249,243, dated Dec. 27, 2005.
Response to Office Action in U.S. Appl. No. 10/249,243, dated Mar. 24, 2006.
Office Action for U.S. Appl. No. 10/249,243, dated Jun. 15, 2006.
Response to Office Action in U.S. Appl. No. 10/249,243, dated Aug. 15, 2006.
Notice of Allowance for U.S. Appl. No. 10/244,243, dated Sep. 18, 2006.
Request for Continued Examination and Information Disclosure Statement in U.S. Appl. No. 10/244,243, dated Dec. 18, 2006.
Notice of Allowance for U.S. Appl. No. 10/244,243, dated Feb. 12, 2007.
Interview Summary by Examiner for U.S. Appl. No. 10/244,243, dated May 11, 2007.
Request for Continued Examination and Information Disclosure Statement in U.S. Appl. No. 10/244,243, dated May 11, 2007.
Notice of Allowance for U.S. Appl. No. 10/244,243, dated Jun. 5, 2007.
Request for Continued Examination and Information Disclosure Statement in U.S. Appl. No. 10/244,243, dated Sep. 5, 2007.
Notice of Allowance for U.S. Appl. No. 10/244,243, dated Oct. 11, 2007.
Office Action in U.S. Appl. No. 10/711,665, dated Mar. 8, 2005.
Amendment in U.S. Appl. No. 10/711,665, dated Jun. 7, 2005.
Notice of Allowance in U.S. Appl. No. 10/711,665, dated Aug. 25, 2005.
Office Action in Japanese Patent Application No. 2003-136788, dated Nov. 14, 2006.
Official Communication in ROC Patent Application No. 091137264, dated Nov. 3, 2006.
Office Action for U.S. Appl. No. 11/036,965, dated Mar. 28, 2006.
Amendment and Response in U.S. Appl. No. 11/036,965 dated Jun. 27, 2006.
Office Action for U.S. Appl. No. 11/036,965, dated Jan. 30, 2007.
Amendment and Response in U.S. Appl. No. 11/036,965 dated Jun. 29, 2007.

(56) References Cited

OTHER PUBLICATIONS

Notice of Allowance for U.S. Appl. No. 11/036,965, dated Sep. 11, 2007.
Office Action for U.S. Appl. No. 12/034,499 dated Jul. 9, 2008.
Amendment and Response in U.S. Appl. No. 12/034,499 dated Oct. 8, 2008.
Office Action for U.S. Appl. No. 12/034,499 dated Jan. 26, 2009.
RCE and Response in U.S. Appl. No. 12/034,499 dated Apr. 27, 2009.
Office Action in U.S. Appl. No. 12/034,499 dated Jul. 16, 2009.
Application Initiated Interview Request in U.S. Appl. No. 12/034,499, dated Oct. 22, 2009.
Examiner Interview Summary in U.S. Appl. No. 12/034,499, dated Oct. 29, 2009.
Amendment and Application Summary of Interview with Examiner in U.S. Appl. No. 12/034,499, dated Dec. 16, 2009.
Office Action in U.S. Appl. No. 12/034,499, dated Apr. 1, 2010.
Examiner Interview Summary in U.S. Appl. No. 12/034,499, dated Jun. 9, 2010.
RCE and Response in U.S. Appl. No. 12/034,499 dated Jul. 1, 2010.
Office Action for U.S. Appl. No. 12/014,657, dated Aug. 21, 2008.
Amendment and Response in U.S. Appl. No. 12/014,657, dated Nov. 21, 2008.
Office Action for U.S. Appl. No. 12/014,657, dated Mar. 5, 2009.
Amendment and Response in U.S. Appl. No. 12/014,657, dated Jun. 5, 2009.
Office Action for U.S. Appl. No. 12/014,657, dated Oct. 15, 2009.
Amendment and Response in U.S. Appl. No. 12/014,657, dated Feb. 16, 2010.
Office Action for U.S. Appl. No. 12/014,657, dated May 28, 2010.
Amendment and Response in U.S. Appl. No. 12/014,657, dated Aug. 30, 2010.
International Search Report and Written Opinion in PCT/US2005/002986 dated Jun. 8, 2005.
International Preliminary Report of Patentability in PCT/US2005/002986 dated Aug. 17, 2006.
Official Communication in Chinese Patent Application No. 2005800003812.0 dated Mar. 7, 2008.
Official Communication in European Patent Application No. 05712433 dated Mar. 9, 2010.
Official Communication in Japanese Patent Application No. 2006552191, dated Sep. 8, 2009.
Official Communication in Japanese Patent Application No. 2006552191, dated Mar. 30, 2010.
Official Communication in Russian Patent Application No. 2006131568 Feb. 20, 2009.
Official Communication in ROC Patent Application No. 094103300 dated Mar. 26, 2010.
Official Communication in ROC Patent Application No. 094103300 dated Aug. 16, 2006.
Official Communication in Vietnamese Patent Application No. 1-2006-01453, dated Dec. 16, 2009.
Extended Search Report in European Application No. 08152870.5 dated Mar. 3, 2010.
International Search Report and Written Opinion in PCT/US2007/020680 dated Jul. 1, 2008.
International Preliminary Report of Patentability in PCT/US2007/020680 dated Apr. 16, 2009.
Notice of Allowance in U.S. Appl. No. 12/034,499, dated Sep. 3, 2010.
Request for Continued Examination, Preliminary Amendment, and Information Disclosure Statement in U.S. Appl. No. 12/034,499, dated Dec. 1, 2010.
Notice of Allowance in U.S. Appl. No. 12/034,499, dated Jan. 10, 2011.
Request for Continued Examination and Information Disclosure Statement in U.S. Appl. No. 12/034,499, dated Apr. 8, 2011.
Official Communication in Canadian Application No. 2554980, dated Feb. 8, 2011.
Official Communication in Chinese Application No. 201010140527.6, dated Oct. 12, 2010.

Office Action in Japanese Application No. 2006-552191, dated Oct. 19, 2010.
Official Communication in Mexican Application No. PA/a/2006/008719 dated Aug. 12, 2008.
Official Communication in Chinese Application No. 03103516.7, dated Mar. 11, 2005.
Office Action in Japanese Patent Application No. 2003-136788, dated Oct. 25, 2005.
Office Action in Korean Patent Application No. 10-2003-0026833, dated Apr. 30, 2005.
Official Communication in ROC Patent Application No. 091137264, dated Jul. 4, 2005.
Office Communication from the USPTO for U.S. Appl. No. 10/249,244 dated Sep. 29, 2004.
Amendment in Reply to Office Communication from the USPTO for U.S. Appl. No. 10/249,244 dated Nov. 15, 2004.
Notice of Allowance from the USPTO for U.S. Appl. No. 10/249,244 dated Jan. 26, 2005.
Official Communication in Chinese Application No. 03100366.4, dated Apr. 8, 2005.
Official Communication in Japanese Application No. 2003-136787 dated Oct. 25, 2005.
Official Communication in Japanese Application No. 2003-136787 dated Nov. 14, 2006.
Official Communication in Taiwanese Application No. 091137638, dated Mar. 11, 2004.
Notice of Allowance in U.S. Appl. No. 10/812,257, dated Dec. 21, 2004.
Office Action in Chinese Patent Application No. 2004-100285290, dated Oct. 21, 2005.
Office Action in Chinese Patent Application No. 2004-100285290, dated Jul. 14, 2006.
Office Action in Chinese Patent Application No. 2004-100285290, dated Nov. 3, 2006.
Office Action in Japanese Patent Application No. 2004-104188, dated Nov. 21, 2006.
Office Action in Japanese Patent Application No. 2004-104188, dated Mar. 20, 2007.
Office Action in Japanese Patent Application No. 2004-104188, dated Aug. 28, 2007.
Office Action in Korean Patent Application No. 10-2004-0025016, dated Mar. 21, 2006.
Preliminary Amendment in U.S. Appl. No. 12/444,142, dated Apr. 2, 2009.
Official Communication in Chinese Patent Application No. 200780037248.3, dated Aug. 6, 2010.
Office Action for European Patent Application No. 07 838 811.3, dated Mar. 19, 2009.
Official Communication in European Application No. 07 838 811, dated Mar. 2, 2010.
Summons to Attend Oral Proceedings in European Application No. 07 838 811, dated Mar. 18, 2011.
Abilieah A, "Optical Tiled AMLCD for Very Large Display Applications," SID International Symposium Digest of Papers, Boston, 1992, 945-949.
"ABS 407 Visible Narrow Band Absorber," downloaded from http://www.exciton.com/pdfs/ABS407.pdf on Feb. 8, 2011.
Akasaka Y., "Three-Dimensional IC Trends," Proceedings of IEEE, 1986, vol. 74 (12), pp. 1703-1714.
Aratani K, et al., "Process and Design Considerations for Surface Micromachined Beams for a Tuneable Interferometer Array in Silicon," Proc. IEEE Microelectromechanical workshop fort Lauderdale FL, 1993, 230-235.
Aratani K. et al., "Surface Micromachined Tuneable Interferometer Array," Sensors and Actuators A,Elsevier Sequoia S.A., Lausanne, CH, A, 1993, 43(1/3), 17-23.
Austrian Search Report for U.S. Appl. No. 11/040,824 dated Jul. 14, 2005 (Publication No. 2006/077522).
Austrian Search Report for U.S. Appl. No. 11/052,004 dated Jul. 1, 2005 (Publication No. 2006/077509).
Austrian Search Report for U.S. Appl. No. 11/057,392 dated May 12, 2005 (Publication No. 2006/077510).

(56) References Cited

OTHER PUBLICATIONS

Austrian Search Report for U.S. Appl. No. 11/064,143 dated Aug. 12, 2005.
Austrian Search Report for U.S. Appl. No. 11/051,258 dated May 13, 2005.
Austrian Search Report for U.S. Appl. No. 11/077,974 dated Jul. 14, 2005.
Austrian Search Report in U.S. Appl. No. 11/041,020 dated May 9, 2005.
Billard C, "Tunable Capacitor," 5th Annual Review of LETI, 2003, 7 Pages.
Brosnihan, et al., "Optical MEMS—A Fabrication Process for MEMS Optical Switches With Integrated On-Chip Electronics," 12th International Conference on Transducers, Solid-State Sensors, Actuators and Microsystems, 2003, vol. 2, pp. 1638-1642.
Cacharelis, et al., "A Reflective-Mode PDLC Light Valve Display Technology," Proceedings of European Solid State Device Research Conference (ESSDERC), 1997, pp. 596-599.
Chemical Properties Handbook, McGraw-Hill, 1999, Refractive Index, Dipole Moment and Radius of Gyration; Inorganic Compounds, No. 151: O2Si.
Conner, "Hybrid Color Display using Optical Interference Filter Array," SID Digest, 1993, 577-580.
Co-pending U.S. Appl. No. 13/494,897, filed Jun. 12, 2012.
Co-pending U.S. Appl. No. 13/494,898, filed Jun. 12, 2012.
Demiryont, et al., "Innovative Transparent Electrode for Flexible Displays," Defense, Security, Cockpit and Future Display II, Proc. of SPIE, Apr. 2006, vol. 6225, pp. 622519-1 to 622519-9.
Dewitt S, "Integrating Touch Screens and Optical Films When Where and How," 3M Touch Systems Society for Information Display, Americas Display Engineering & Applications Conference, Oct. 24-27, 2005, Portland, Oregon U.S.A.
Dokmeci, et al., "Two-Axis Single-Crytal Silicon Micromirror Arrays," Journal of Microelectromechanical Systems, Dec. 2004, 13(6), 1006-1017.
Fan, et al., "Channel Drop Filters in Photonic Crystals," Optics Express, 1998, vol. 3(1), pp. 4-11.
Feenstra, et al., "Electrowetting displays," Liquavista BV, Jan. 2006, 16 pp.
Giles, et al., "A Silicon Mems Optical Switch Attenuator and its Use in Lightwave Subsystems," IEEE Journal of Selected Topics in Quantum Electronics, 1999, 5 (1), 18-25.
"Glass Polarizing and Interference Filters," American Institute of Physics Handbook, 1982, pp. 6-172 to 6-178.
Gokturk, et al., "A Time-Of-Flight Depth Sensor—System Description, Issues and Solutions," 2004 Conference on Computer Vision and Pattern Recognition workshop (CVPRW'04), 2004, 3, 35-42.
Goossen, et al., "Silicon Modulator Based on Mechnically-Active Anti-Reflection Layer With 1Mbit/Sec Capability for Fiber-In-The-Loop Applications," IEEE Photonics Technology Letters, 1994, 1119-1121.
Goossen K.W. et al., "Possible Display Applications of the Silicon Mechanical Antireflection Switch," Society for Information Display, 1994.
Goossen K.W., "MEMS-Based Variable Optical Interferences Devices," IEEE/Lens International Conference on Optical Mems, Conference Digest, Piscataway, NJ, USA, IEEE Aug. 21, 2000, pp. 17-18.
Gosch, "West Germany Grabs the Lead in X-Ray Lithography," Electronics, 1987, 78-80.
Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.
Howard, et al., "Nanometer-Scale Fabrication Techniques," VLSI Electronics: Microstructure Science, 1982, vol. 5, 145-153, 166-173.
Huang, et al., "Multidirectional Asymmetrical Microlens-Array Light Control Films for High Performance Reflective Liquid Crystal Displays," SID Digest, 2002, pp. 870-873.

Imenes, et al., "Spectral Beam Splitting Technology for Increased Conversion Efficiency in Solar Concentrating Systems a Review," Solar Energy Materials, Elsevier Science, Publishers B.V. Amsterdam, NL, Oct. 1, 2004, vol. 84, pp. 19-69, XP002474546.
Jackson, "Classical Electrodynamics," John Wiley & Sons Inc, 1962, pp. 568-573.
Jerman, et al., "A Miniature Fabry-Perot Interferometer Fabricated Using Silicon Micromachining Techniques," IEEE Electron Devices Society, 1988.
Jerman et al., "A Miniature Fabry-Perot Interferometer with a Corrugated Silicon Diaphragm Support", IEEE Electron Devices Society, pp. 140-144, 1990.
Jerman, et al., "Miniature Fabry-Perot Interferometers Micromachined in Silicon for use in Optical Fiber WDM Systems," Transducers, Proceedings on the International Conference on Solid State Sensors and Actuators, 1991, vol. ConF. 6, San Francisco, 372-375.
Johnson, "Optical Scanners," Microwave Scanning Antennas, 1964, vol. 1(2), 251-261.
Kowarz, et al., "Conformal Grating Electromechanical System (Gems) for High-Speed Digital Light Modulatuion," Proceedings of the IEEE 15th Annual International Conference on Micro Electro Mechanical Systems, MEMS 2002, pp. 568-573.
Lau, "The Characterization of Silicon Dioxide and Silicon Nitride Thin Films, In Infrared Characterization for Microelectronics," World Scientific Publishing Co. Pte. Ltd., New Jersey, 1999, 5, pp. 55-71.
Lezec, "Submicrometer Dimple Array Based Interference Color Field Displays and Sensors," Nano Letters, 2006, 7(2), 329-333.
Light Over Matter Circle No. 36, Jun. 1993.
Lin, et al., "Development of UV Stable LED Encapsulants," Microsystems, Packaging, Assembly and Circuits Technology Conference, IMPACT 2009, 4th, 565-567.
Little, et al., "Vertically Coupled Microring Resonator Channel Dropping Filter," IEEE Photonics Technology Letters, 1999, 11(2), 215-217.
Londergan, et al., "Advanced processes for MEMS-based displays," Proceedings of the Asia Display, 2007, SID, 1, 107-112.
Longhurst R.S., "Geometrical and Physical Optics", Chapter IX: Multiple Beam Interferometry, pp. 153-157,1963.
Maeda, et al., "A Study of a High Quality Front Lighting System for Reflective Full-Color Liquid Crystal Displays," Record of Electrical and Communication, Engineering Conversazione Tohoku University, Sep. 2009, v 78(1), 415-416, ISSN: 0385-7719.
Magel G.A., "Integrated Optic Devices using Micromachined Metal Membranes," SPIE, 1996, vol. 2686, 54-63.
Maier et al., 1996 1.3" ActiveMatrix liquid crystal spatial light modulator with 508 dpi resolution, SPIE vol. 2754, pp. 171-179.
Mehregany, et al., "MEMS Applications in Optical Systems," IEEE/LEOS 1996 Summer Topical Meetings, 1996, 75-76.
Miles M., et al., "Digital Paper (TM) for reflective displays", Journal of the Society for Information Display, Society for Information Display, vol. 11 (1), pp. 209-215, 2003 ,XP002358929, ISSN: 1071-0922.
Miles M.W., "A MEMS Based Interferometric Modulator (IMOD) for Display Applications" Proceedings of Sensors Expo, Oct. 21, 1997 © 1997 Helmer's Publishing, Inc., pp. 281-284 XP009058455.
Miles M.W., "A New Reflective FPD Technology using Interferometric Modulation," Journal of the SID, 1997, vol. 5(4), 379-382.
Miles M.W., et al., "Interferometric Modulation MEMS as an enabling technology for high-performance reflective displays," Proceedings of the SPIE, 2003, 4985, 131-139.
Nakagawa et al., "Wide-Field -of-View Narrow-Band Spectral Filters Based on Photonic Crystal Nanocavities", Optical Society of America, Optics Letters, vol. 27, No. 3, pp. 191-193, Feb. 1, 2002.
Neal T.D. et al., "Surface Plasmon Enhanced Emission From Dye Doped Polymer Layers," Optics Express Opt. Soc. America, USA, Jul. 11, 2005,vol. 13(14), 5522-5527.
Newsbreaks, "Quantum-trench devices might operated at terahertz frequencies", Laser Focus World, May 1993.

(56) References Cited

OTHER PUBLICATIONS

Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.
Obi et al., "Fabrication of Optical Mems in Sol/Gel Materials," IEEE/LEOS International Conference on Optical Mems, 2002, Conference Digest, pp. 39-40.
Oliner, "Radiating Elements and Mutual Coupling," Microwave Scanning Antennas, 1966, vol. 2, 131-157 and pp. 190-194.
Pape, et al., "Characteristics of the Deformable Mirror Device for Optical Information Processing," Optical Engineering, Nov.-Dec. 1983, 22(6), 676-681.
Petschick, et.al., "Fabry-Perot-Interferometer," available at http://pl.physik.tuberlin.de/groups/pg279/protokolless02/04_fpi.pdf, pp. 50-60, May 14, 2002.
Qualcomm MEMS Technologies, Inc., May 2008, Interferometric Modulator (IMOD), Technology Overview, White Paper, 14 pp.
Raley, et al., "A Fabry-Perot Microinterferometer for Visible Wavelengths," IEEE Solid-State Sensor and Actuator Workshop, 1992, 170-173.
Sperger, et al., "High Performance Patterned All-Dielectric Interference Colour Filter for Display Applications," SID Digest, 1994, 81-83.
Stone J.M., "Radiation and Optics, An Introduction to the Classic Theory," 1963, McGraw-Hill, pp. 340-343.
Tai C.Y., et al., "A Transparent Front Lighting System for Reflective-type Displays," SID International Symposium Digest of Technical Papers, Orlando,SID International Symposium Digest of Technical Papers, Santa Ana, SID, vol. 26, 375-378,1995, (XP000657155).
Tai C.Y. et al., "A Transparent Sheet Display by Plastic MEMS," Journal of the SID, 2006, vol. 14 (8), 735-741.
Tolansky, "Multiple-Beam Interference in Multiple-Beam Interferometry of Surfaces and Films," Chap II Oxford at the Clarendon Press, 1948, pp. 8-11.
Walker, et al., "Electron-Beam-Tunable Interference Filter Spatial Light Modulator," Optics Letters, 1988, vol. 13(5), 345-347.
Wang, et al., "Design and Fabrication of a Novel TWO-Dimension MEMS-Based Tunable Capacitor," IEEE International Conference on Communications, Circuits and Systems and West Sino Expositions, 2002, vol. 2, 1766-1769.
Winton et al., "A novel way to capture solar energy," Chemical Week, pp. 17-18 (May 15, 1985).
Wu, et al., "Design of a Reflective Color LCD using Optical Interference Reflectors," Asia Display, Changchun Institute of Physics, 1995, 929-931.
Zhou et al., "Waveguide Panel Display Using Electromechanism Spatial Modulators," SID Digest, 1998, vol. XXIX.
Co-pending U.S. Appl. No. 14/057,975, filed on Oct. 18, 2013 (133623).
Yan, et al., "Edge-Lighting Light Guide Plate Based on Micro-Prism for Liquid Crystal Display," Journal of Display Technology, vol. 5, No. 9, pp. 355-357, Sep. 2009.
Yu et al., "Design Optimization and Stamper Fabrication of Light Guiding Plates Using Silicon Based Micro-Features," IEEE Symposium on DTIP of MEMS/MOEMS, Rome, Apr. 1-3, 2009.

\* cited by examiner

OPTICAL INTERFERENCE TYPE OF COLOR DISPLAY HAVING OPTICAL DIFFUSION LAYER BETWEEN SUBSTRATE AND ELECTRODE

CROSS-REFERENCE TO RELATED APPLICATIONS

This application claims the benefit and priority to and is a continuation of U.S. application Ser. No. 10/249,243, filed on Mar. 26, 2003, which claims priority to Taiwan Application Serial Number 91137264, filed on Dec. 25, 2002. The disclosure of U.S. application Ser. No. 10/249,243 is hereby incorporated by reference in its entirety.

BACKGROUND OF INVENTION

The present invention relates to an optical interference type of color display. More particularly, the present invention relates to an optical interference type of color display having an improved color shift and contrast ratio (CR).

DESCRIPTION OF RELATED ART

At present, lightweight and slim flat panel displays such as liquid crystal display (LCD), organic light-emitting device (OLED) or plasma display panel (PDP) are widely adopted in our everyday life. In particular, liquid crystal panels have become one of the mainstream displays. However, most LCD still has a number of drawbacks including narrow visual angle, moderate response time, need for a color filter for full coloration, and need for a polarizer leading to a poor optical utilization of light source and energy wastage by a back light module.

To improve the operating efficiency of LCD, a new type of LCD called an optical interference display is developed. The optical interference panel comprises an array of optical interference modulators. Each optical interference modulator includes a transparent electrode, a reflective electrode and a support layer for supporting the reflective electrode. Through the support of the support layer, an air gap with a specified thickness is formed between the reflective electrode and the transparent electrode. Light entering from the transparent electrode of the optical interference modulator passes through the air gap and impinges upon the second electrode. Light impinging the second electrode is reflected back to emerge from the modulator through the transparent electrode. Because light passing through air gap of different thickness may result in different degree of optical interference, different colors are produced. For example, red light, green light and blue light can be produced in this way. In addition, the design of the reflective electrode inside the optical interference modulator must integrate with a micro-electromechanical system (MEMS) so that the optical interference modulator can switch between an "on" or an "off" state to illuminate or darken a spot on the panel.

The aforementioned optical interference modulators inside the optical interference display need no additional coloring filter or polarizer for producing a suitable color point and hence able to save some production cost. In addition, each optical interference modulator consumes very little electric power, quick to respond to electrical signals and operates in a bi-stable state. Therefore, the optical interference display is suitable for low power consumption products including most portable device such as mobile phone, personal digital assistant (PDA), electronic book (e-book) and so on.

FIG. 1 is a schematic sectional view of a conventional optical interference color display structure. As shown in FIG. 1, the optical interference color display 100 mainly comprises a transparent substrate 110, a patterned support layer 120, a plurality of first electrodes 130, a plurality of optical films 140 and a plurality of second electrodes 150. In general, the transparent substrate 110 is a glass substrate or a substrate made from a transparent material. The patterned support layer 120 is positioned on the transparent substrate 110 for supporting the edges of the second electrodes 150. The first electrodes 130 are also positioned on the transparent substrate 110. The first electrodes 130 are transparent electrodes fabricated using a material including indium-tin-oxide (ITO). The optical film 140 is positioned on the first electrodes 130. Typically, the optical film 140 is a composite stack having a multiple of alternately positioned high dielectric constant films and low dielectric constant films. The second electrodes 150 are positioned over the first electrodes 130. Through the support of the patterned support layer 120, the second electrodes 150 are positioned over the first electrodes 130. The second electrodes 150 are typically fabricated using a highly reflective metallic material.

In general, a conventional optical interference color panel comprises a plurality of optical interference modulators each having a different air gap thickness. As shown in FIG. 1, the air gap between the second electrode 150 and the first electrode 130 is different for different optical interference modulators. To produce color light, the optical interference modulators are designed to have three different air gap separations d1, d2 and d3. The optical interference modulator with an air gap separation of d1 emits red light; the optical interference modulator with an air gap separation of d2 emits blue light; and, the optical interference modulator with an air gap separation of d3 emits green light. In other words, as light coming from outside penetrates through the transparent substrate 110, the first electrodes 130 and the optical films 140, the light needs to pass through different air gap thickness d1, d2, d3 before arriving at the respective second electrodes 150. Thereafter, the light emerges from the transparent substrate 1100 after reflecting back by the second electrodes 150. Due to different degree of interference at different air gap thickness, red light, green light and blue light are produced.

In a conventional optical interference modulator, the second electrode 150 must be fabricated using a reflective material with good mechanical properties. When the second electrode 150 and the first electrode 130 are coupled to a bias voltage, the second electrode 150 may shift towards the first electrode 130 due to electrostatic attraction. Any movement of the second electrode 150 may lead to a slight variation of the air gap d1, d2 and d3. Through a slight change in the thickness of the air gaps d1, d2, and d3, various optical interference modulators (pixels) within the display can be switched to an "on" or an "off" state.

In the optical interference color display 100, images on display may be affected by user's viewing angle due to an intensification of color shift and a deterioration of contrast ratio. Thus, the conventional technique often demands the attachment of an optical diffusion plate 160 to the outer surface of the transparent substrate 110 for improving color shift and contrast ratio. However, the attachment of an optical diffusion plate not only increases the overall thickness of the color display 100 (an additional thickness of about 2 mm), but also increases material cost.

SUMMARY OF INVENTION

Accordingly, one object of the present invention is to provide an optical interference color display having an improved color shift and contrast ratio by forming layers of films inside a panel instead of attaching an optical diffusion plate outside the panel.

To achieve these and other advantages and in accordance with the purpose of the invention, as embodied and broadly described herein, the invention provides an optical interference color display. The optical interference color display mainly comprises a transparent substrate, an inner-front optical diffusion layer, a plurality of first electrodes, a patterned support layer, a plurality of optical films and a plurality of second electrodes. The inner-front optical diffusion layer is positioned on the transparent substrate. The first electrodes are positioned on the inner-front optical diffusion layer. The patterned support layer is also positioned on the inner-front optical diffusion layer but between the first electrodes. The optical films are positioned over the first electrodes. The second electrodes are positioned over the respective first electrodes and supported by the patterned support layer. In addition, there is an air gap between each first and second electrode pair.

In this embodiment, the inner-front optical diffusion layer includes, for example, a first film and a second film. The first film is directly attached to the transparent substrate and the second film is positioned on the first film. The interface between the first film and the second film further provides a dispersive surface. The first film is fabricated using indium-tin-oxide and the second film is fabricated using silicon nitride or silicon oxide, for example.

In this embodiment, the surface of second electrode facing the first electrode may further include an inner-back optical diffusion layer. The inner-back optical diffusion layer is fabricated on the optical interference color display in the same process as fabricating the inner-front optical diffusion layer. Furthermore, this invention also permits the formation of the inner-back optical diffusion layer without an inner-front optical diffusion layer.

In this embodiment, the inner-back optical diffusion layer is supported by the patterned support layer and separated from the first electrode by an air gap. The inner-back optical diffusion layer includes, for example, a third film and a fourth film. The third film is directly attached to the first electrode and the fourth film is positioned over the third film. The interface between the third film and the fourth film further provides a dispersive surface. The third film is fabricated using indium-tin-oxide and the fourth film is fabricated using silicon nitride or silicon oxide, for example.

In this embodiment, the transparent substrate is, for example, a glass substrate. The first electrodes are transparent electrodes fabricated using, for example, indium-tin-oxide. The second electrodes are metallic electrodes fabricated using, for example, molybdenum, molybdenum alloy, aluminum, aluminum alloy, chromium or other conductive metallic materials.

In this embodiment, the optical film comprises, for example, at least a first dielectric film and at least a second dielectric film. The second dielectric film and the first dielectric film are alternately stacked over each other. The second dielectric film has a dielectric constant that differs from the first dielectric film.

This invention permits selective deployment of an inner-front optical diffusion layer and an inner-back optical diffusion layer. The optical diffusion layer replaces the attached optical diffusion plate structure in a conventional design and improves display properties including the color shift and contrast ratio.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
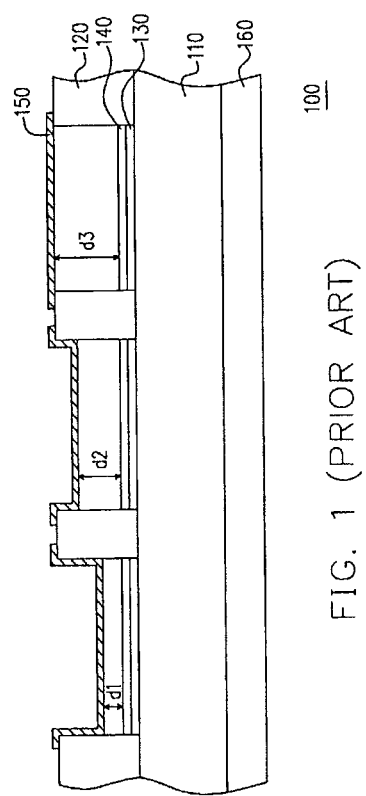
FIG. 1 is a schematic sectional view of a conventional optical interference color display structure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
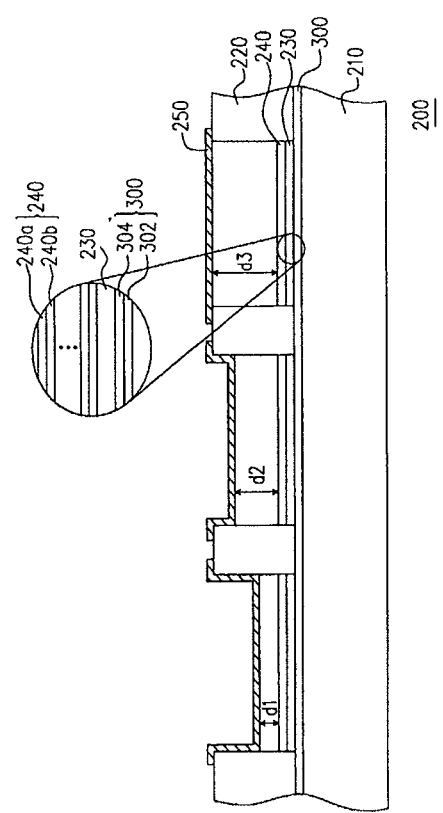
FIG. 2 is a schematic sectional view of an optical interference color display structure according to a first preferred embodiment of this invention.

FIG. 2 is a schematic sectional view of an optical interference color display structure according to a first preferred embodiment of this invention. As shown in FIG. 2, the optical interference color panel 200 mainly comprises a transparent substrate 210, an inner-front optical diffusion layer 300, a patterned support layer 220, a plurality of first electrodes 230, a plurality of optical films 240 and a plurality of second electrodes 250. The inner-front optical diffusion layer 300 is positioned over the transparent substrate 210 covering the entire surface of the transparent substrate 210, for example. The patterned support layer 220 is also positioned over the transparent substrate 210 for supporting the edges of the second electrodes 250. The first electrodes 230 are positioned on the transparent substrate 210. The optical films 240 are positioned on the first electrodes 230. The second electrodes 250 are positioned over the respective first electrodes 230 and supported through the patterned support layer 220.

In this embodiment, the transparent substrate 210 is, for example, a glass substrate or a substrate made from some other transparent materials. The patterned support layer 220 may include a plurality of cylindrical bodies fabricated using, for example, resinous material. The first electrodes 230 are transparent electrodes fabricated using, for example, indium-tin-oxide (ITO). The optical film 240 includes, for example, at least a first dielectric film 240a and a second dielectric film 240b alternately stacked over each other. The second dielectric film 240a has a dielectric constant that differs from the first dielectric film 240b. Since the second electrodes 250 serves as reflective electrodes, the second electrodes 250 must have good mechanical properties. Hence, the second electrodes 250 are fabricated using a sturdy material including, for example, aluminum or an alloy of aluminum.

To produce a color display, the optical interference modulators inside the optical interference color panel 200 are fabricated with one of three different air gap thickness (d1, d2 and d3). For example, an optical interference modulator having an air gap thickness of d1 emits red light. Similarly, an optical interference modulator having an air gap thickness of d2 emits blue light and an optical interference modulator having an air gap thickness of d3 emits green light. In other words, external light passing through the transparent substrate 210, the inner-front diffusion layer 300, the first electrode 230 and the optical film 240 will have to pass through an air gap of different thickness (d1, d2, d3) before reacting the second electrode 250. Thereafter, the light is reflected back from the second electrode 250 to emerge as an output beam through the transparent substrate 210. Due to a different degree of interference through the optical path, red, green and blue light are produced accordingly.

In general, the second electrode 250 serves as a reflective electrode and has good mechanical properties. When a bias voltage is applied between the second electrode 250 and the first electrode 230, the second electrode 250 will move slightly towards the first electrode 230 due to electrostatic attraction. Such movement changes the air gap d1, d2 or d3 inside the optical interference modulator. In other words, through a change in the air gap thickness d1, d2 or d3 inside the optical interference modulator, the "on" state or the "off" state of optical interference modulators (pixels) is set.

To improve color shift and reduce contrast ratio deterioration, this invention also provides an inner-front optical diffusion plate 300 on the transparent substrate 210.

The inner-front optical diffusion plate 300 includes, for example, a first film 302 and a second film 304. The first film 302 is attached to the transparent substrate 210 and the second film 304 is positioned over the first film 302. The interface between the first film 302 and the second film 304 provides a dispersive surface. The first film 302 is fabricated using a material including, for example, indium-tin-oxide. The second film 304 is fabricated using a material including, for example, silicon nitride or silicon oxide. In addition, the inner-front optical diffusion plate 300 is formed over the transparent substrate 210, for example, by conducting a plasma-enhanced chemical vapor deposition (PECVD) with the processing conditions shown in Table 1 below.

TABLE 1

| | Gas flow rate of reactive gases | Power rating | Thickness | Temperature |
|---|---|---|---|---|
| Indium-tin-oxide (ITO) reaction | Ar: 100 sccm<br>$O_2$: 1.0 sccm | 3.4 kW | 420 Å | Room Temperature |
| Silicon nitride indium-tin-oxide reaction | $N_2$: 5000 sccm<br>$HN_3$: 2000 sccm<br>$SiH_4$: 350 sccm | 2100 kW | 6000 Å | 380° C. |

Figure 3:
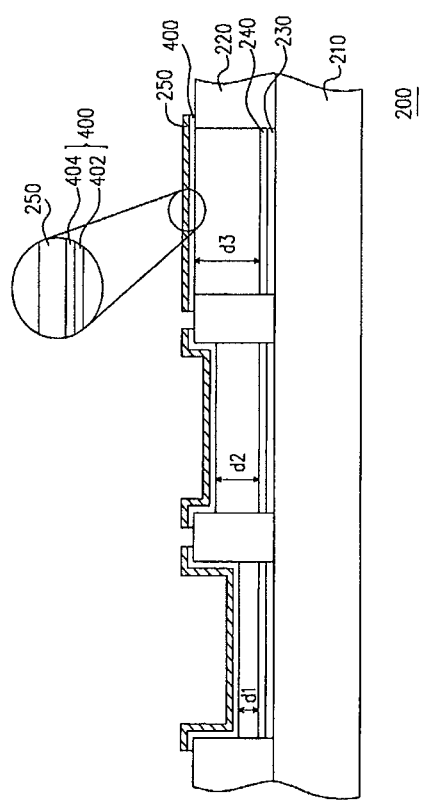
FIG. 3 is a schematic sectional view of an optical interference color display structure according to a second preferred embodiment of this invention.

FIG. 3 is a schematic sectional view of an optical interference color display structure according to a second preferred embodiment of this invention. As shown in FIG. 3, an inner-back optical diffusion layer 400 is formed on the surface of the second electrode 250 facing the first electrode 230. The inner-back optical diffusion layer 400 is supported by the patterned support layer 220 and separated from the first electrode 230 by an air gap thickness of d1, d2 or d3. The inner-back optical diffusion layer 400 comprises, for example, a third film 402 and a fourth film 404. The third film 402 is positioned over the first electrode 230 and the fourth film 404 is positioned over the third film 402. The interface between the third film 402 and the fourth film 404 provides a dispersive surface. The third film 402 is fabricated using a material including, for example, indium-tin-oxide. The fourth film 404 is fabricated using a material including, for example, silicon nitride or silicon oxide.

Figure 4:
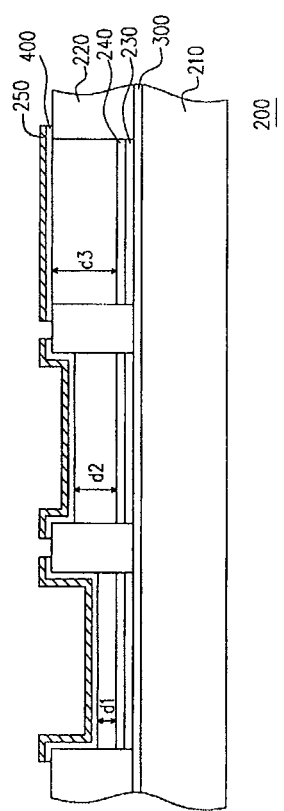
FIG. 4 is a schematic sectional view of an optical interference color display structure according to a third preferred embodiment of this invention.

FIG. 4 is a schematic sectional view of an optical interference color display structure according to a third preferred embodiment of this invention. As shown in FIG. 4, the optical interference color display has a structure similar to the first and the second embodiment. One major difference is that an inner-front optical diffusion layer 300 and an inner-back optical diffusion layer 400 are formed inside the optical interference color panel 200. After integrating the inner-front optical diffusion layer 300 and the inner-back optical diffuison layer 400, color shift and contrast ratio deterioration are improved leading to a better overall performance in the optical interference color panel 200.

In conclusion, the optical interference color pane has at least the following advantages:

1. The inner-front optical interference layer and the inner-back optical interference layer can be selectively employed or both can be used together to supplant the conventional attached optical diffusion plate so that both color shift and contrast ratio deterioration are improved.

2. The inner-front optical diffusion layer and/or the inner-back optical interference diffusion layer can be fabricated by conducting a plasma-enhanced chemical vapor deposition. This method of fabrication is more effective in controlling the optical properties including dispersion of various optical diffusion layers. In other words, overall luminance of the panel is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical apparatus, comprising:
    a substrate;
    a first electrode;
    an optical layer configured to alter the optical properties of light, the optical layer between the substrate and the first electrode, the optical layer comprising an optical diffusion layer; and
    a second movable electrode, the first electrode between the optical layer and the second movable electrode.

2. The apparatus of claim 1, further comprising a cavity between the first electrode and the second movable electrode.

3. The apparatus of claim 2, wherein the cavity comprises an air gap.

4. The apparatus of claim 1, wherein the second movable electrode is configured to move towards the first electrode.

5. The apparatus of claim 1, further comprising a support over the substrate, wherein the second movable electrode is over the support.

6. The apparatus of claim 1, wherein the optical layer comprises a plurality of films.

7. The apparatus of claim 1, further comprising a dielectric film between the first electrode and the second movable electrode.

8. The apparatus of claim 1, wherein the first electrode and the second movable electrode comprise at least part of an interferometric modulator.

9. A method of manufacturing an apparatus, comprising:
    disposing an optical layer over a substrate, the optical layer comprising an optical diffusion layer;

disposing a first electrode over both the substrate and the optical layer, such that the optical layer is between the substrate and the first electrode; and disposing a second movable electrode over the first electrode, such that the first electrode is between the optical layer and the second movable electrode, wherein the optical layer is configured to alter the optical properties of light.

10. The method of claim 9, further comprising forming a cavity between the first electrode and the second movable electrode.

11. The method of claim 10, wherein the cavity comprises an air gap.

12. The method of claim 9, wherein the second movable electrode is configured to move towards the first electrode.

13. The method of claim 9, further comprising forming a support over the substrate.

14. The method of claim 9, wherein the optical layer comprises a plurality of films.

15. The method of claim 9, further comprising disposing a dielectric film over the first electrode, wherein the second movable electrode is disposed over the dielectric film.

16. The method of claim 9, wherein the first electrode and the second movable electrode comprise at least part of an interferometric modulator.

17. The apparatus of claim 1, further comprising an optical film over the first electrode.

18. The method of claim 9, further comprising disposing an optical film over the first electrode, wherein the second movable electrode is disposed over the optical film.

19. The apparatus of claim 1, wherein the optical diffusion layer includes surface diffusive features.

\* \* \* \* \*